United States Patent
Prakash et al.

(10) Patent No.: US 9,055,552 B2
(45) Date of Patent: Jun. 9, 2015

(54) QUICK PAGING CHANNEL WITH REDUCED PROBABILITY OF MISSED PAGE

(75) Inventors: Rajat Prakash, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 11/454,474

(22) Filed: Jun. 15, 2006

(65) Prior Publication Data

US 2007/0015523 A1   Jan. 18, 2007

Related U.S. Application Data

(60) Provisional application No. 60/691,469, filed on Jun. 16, 2005, provisional application No. 60/731,037, filed on Oct. 27, 2005.

(51) Int. Cl.
  *H04W 68/00* (2009.01)
  *H04W 68/02* (2009.01)

(52) U.S. Cl.
  CPC .............. *H04W 68/02* (2013.01); *H04W 68/00* (2013.01); *Y02B 60/50* (2013.01)

(58) Field of Classification Search
  USPC .......................... 370/259; 455/426.1, 458, 515
  See application file for complete search history.

(56) References Cited

U.S. PATENT DOCUMENTS

| | | | |
|---|---|---|---|
| 5,021,777 A | 6/1991 | Gross et al. | |
| 5,196,728 A | 3/1993 | Jaux | |
| 5,267,261 A | 11/1993 | Blakeney, II et al. | |
| 5,276,911 A | 1/1994 | Levine et al. | |
| 5,289,527 A | 2/1994 | Tiedemann, Jr. | |
| 5,363,426 A | 11/1994 | Nyhart | |
| 5,406,613 A | 4/1995 | Peponides et al. | |
| 5,490,139 A | 2/1996 | Baker et al. | |
| 5,619,492 A | 4/1997 | Press et al. | |
| 5,640,414 A | 6/1997 | Blakeney, II et al. | |
| 5,678,192 A | 10/1997 | Paavonen et al. | |
| 5,719,562 A * | 2/1998 | Fawcett | 340/7.45 |

(Continued)

FOREIGN PATENT DOCUMENTS

| | | |
|---|---|---|
| CA | 2340201 A1 | 1/2001 |
| CN | 1346580 A | 4/2002 |

(Continued)

OTHER PUBLICATIONS

International Search Report—PCT/US2006/23587—International Search Authority/US—Jan. 11, 2007.

(Continued)

*Primary Examiner* — Wayne Cai
*Assistant Examiner* — Matthew Genack
(74) *Attorney, Agent, or Firm* — Darren M. Simon

(57) ABSTRACT

Systems and methods of generating quick paging messages having nearly unique identifiers and variable capacity are described. The system generates a quick paging message identifying an access terminal to indicate the presence of a scheduled paging message for that access terminal. The system generates a quick paging notification for each access terminal having a scheduled paging message and generates a compressed nearly unique identifier of each access terminal that is notified in the quick paging message. The compression technique can vary based on the number of bits allocated to the quick paging message as well as the number of access terminals notified in one quick paging message.

52 Claims, 8 Drawing Sheets

(56) References Cited

U.S. PATENT DOCUMENTS

| | | |
|---|---|---|
| 5,802,467 A | 9/1998 | Salazar et al. |
| 5,815,507 A | 9/1998 | Vinggaard et al. |
| 5,818,825 A | 10/1998 | Corrigan et al. |
| 5,818,842 A | 10/1998 | Burwell et al. |
| 5,825,752 A | 10/1998 | Fujimori et al. |
| 5,878,033 A | 3/1999 | Mouly |
| 5,913,168 A | 6/1999 | Moreau et al. |
| 5,946,292 A | 8/1999 | Tsujishita et al. |
| 6,006,073 A | 12/1999 | Glauner et al. |
| 6,012,160 A | 1/2000 | Dent |
| 6,038,220 A | 3/2000 | Kang et al. |
| 6,047,189 A | 4/2000 | Yun et al. |
| 6,088,345 A | 7/2000 | Sakoda et al. |
| 6,115,667 A | 9/2000 | Nakamura |
| 6,118,767 A | 9/2000 | Shen et al. |
| 6,119,005 A | 9/2000 | Smolik |
| 6,128,290 A | 10/2000 | Carvey |
| 6,138,034 A | 10/2000 | Willey |
| 6,144,841 A | 11/2000 | Feeney |
| 6,144,861 A | 11/2000 | Sundelin et al. |
| 6,154,659 A | 11/2000 | Jalali et al. |
| 6,157,621 A | 12/2000 | Brown et al. |
| 6,167,248 A | 12/2000 | Hamalainen et al. |
| 6,169,768 B1 | 1/2001 | Okada et al. |
| 6,175,550 B1 | 1/2001 | Van Nee |
| 6,175,557 B1 | 1/2001 | Diachina et al. |
| 6,181,738 B1 | 1/2001 | Chheda et al. |
| 6,181,768 B1 | 1/2001 | Berliner |
| 6,208,699 B1 | 3/2001 | Chen et al. |
| 6,212,175 B1 | 4/2001 | Harsch |
| 6,216,004 B1 | 4/2001 | Tiedemann, Jr. et al. |
| 6,229,800 B1 | 5/2001 | Thompson et al. |
| 6,249,681 B1 | 6/2001 | Virtanen |
| 6,252,865 B1 | 6/2001 | Walton et al. |
| 6,266,529 B1 | 7/2001 | Chheda |
| 6,272,335 B1 | 8/2001 | Nakayama et al. |
| 6,278,882 B1 | 8/2001 | Choi |
| 6,300,864 B1 * | 10/2001 | Willey ............ 340/7.43 |
| 6,307,846 B1 | 10/2001 | Willey |
| 6,320,855 B1 | 11/2001 | Shi |
| 6,359,900 B1 | 3/2002 | Dinakar et al. |
| 6,366,779 B1 | 4/2002 | Bender et al. |
| 6,369,447 B2 | 4/2002 | Mori |
| 6,389,034 B1 | 5/2002 | Guo et al. |
| 6,421,540 B1 | 7/2002 | Gilhousen et al. |
| 6,446,236 B1 | 9/2002 | McEwen et al. |
| 6,477,361 B1 | 11/2002 | LaGrotta et al. |
| 6,480,504 B1 | 11/2002 | Wang et al. |
| 6,483,826 B1 | 11/2002 | Åkerberg |
| 6,493,338 B1 | 12/2002 | Preston et al. |
| 6,519,705 B1 | 2/2003 | Leung |
| 6,532,227 B1 | 3/2003 | Leppisaari et al. |
| 6,535,736 B1 | 3/2003 | Balogh et al. |
| 6,539,030 B1 | 3/2003 | Bender et al. |
| 6,560,774 B1 | 5/2003 | Gordon et al. |
| 6,563,807 B1 | 5/2003 | Kim et al. |
| 6,570,915 B1 | 5/2003 | Sweitzer et al. |
| 6,571,084 B1 | 5/2003 | Jabbary |
| 6,577,608 B1 | 6/2003 | Moon et al. |
| 6,580,726 B1 | 6/2003 | Kumpf et al. |
| 6,597,705 B1 | 7/2003 | Rezaiifar et al. |
| 6,597,923 B1 | 7/2003 | Vanghi et al. |
| 6,603,746 B1 | 8/2003 | Larijani et al. |
| 6,628,956 B2 | 9/2003 | Bark et al. |
| 6,633,554 B1 | 10/2003 | Dalal |
| 6,643,520 B1 | 11/2003 | Park et al. |
| 6,684,080 B1 | 1/2004 | Barnes et al. |
| 6,687,285 B1 | 2/2004 | Jou |
| 6,711,150 B1 | 3/2004 | Vanghi |
| 6,714,511 B1 | 3/2004 | Sudo et al. |
| 6,721,373 B1 | 4/2004 | Frenkel et al. |
| 6,731,943 B1 | 5/2004 | McCormick et al. |
| 6,754,229 B1 | 6/2004 | Islam et al. |
| 6,788,937 B1 | 9/2004 | Willenegger et al. |
| 6,795,425 B1 | 9/2004 | Raith |
| 6,807,164 B1 | 10/2004 | Almgren et al. |
| 6,813,252 B2 | 11/2004 | Chang et al. |
| 6,813,269 B1 | 11/2004 | Clougherty et al. |
| 6,823,192 B2 | 11/2004 | Jou et al. |
| 6,829,493 B1 | 12/2004 | Hunzinger |
| 6,842,619 B2 | 1/2005 | Lee et al. |
| 6,850,499 B2 | 2/2005 | Wheatley, III et al. |
| 6,928,293 B2 | 8/2005 | Park et al. |
| 6,937,700 B1 | 8/2005 | Jang |
| 6,944,146 B1 | 9/2005 | Barany et al. |
| 6,950,669 B2 | 9/2005 | Simonsson |
| 6,952,591 B2 | 10/2005 | Budka et al. |
| 6,963,540 B2 | 11/2005 | Choi et al. |
| 6,967,936 B1 | 11/2005 | Laroia et al. |
| 6,996,131 B1 | 2/2006 | Islam et al. |
| 6,996,391 B2 | 2/2006 | Hunzinger |
| 7,006,477 B1 | 2/2006 | Balachandran et al. |
| 7,046,966 B2 | 5/2006 | Davis |
| 7,058,031 B2 | 6/2006 | Bender et al. |
| 7,072,307 B2 | 7/2006 | Tong et al. |
| 7,099,299 B2 | 8/2006 | Liang et al. |
| 7,110,391 B1 | 9/2006 | Rogers et al. |
| 7,139,575 B1 | 11/2006 | Chen et al. |
| 7,197,692 B2 | 3/2007 | Sutivong et al. |
| 7,203,512 B2 | 4/2007 | Jeong et al. |
| 7,212,831 B2 | 5/2007 | Lee |
| 7,224,993 B2 | 5/2007 | Meyers et al. |
| 7,233,625 B2 | 6/2007 | Ma et al. |
| 7,313,167 B2 | 12/2007 | Yoon et al. |
| 7,313,398 B1 | 12/2007 | Ramahi |
| 7,336,953 B2 | 2/2008 | Kim et al. |
| 7,340,615 B2 | 3/2008 | Krantz et al. |
| 7,342,901 B1 | 3/2008 | Zhang et al. |
| 7,383,432 B1 | 6/2008 | Barnes et al. |
| 7,403,528 B2 | 7/2008 | Hu et al. |
| 7,420,939 B2 | 9/2008 | Laroia et al. |
| 7,466,665 B2 | 12/2008 | Calcev et al. |
| 7,496,058 B2 | 2/2009 | Kim et al. |
| 7,522,631 B1 | 4/2009 | Brown et al. |
| 7,522,919 B2 | 4/2009 | Yoon et al. |
| 7,567,826 B2 | 7/2009 | Sugaya |
| 7,590,095 B2 | 9/2009 | Chen et al. |
| 7,596,127 B1 | 9/2009 | May et al. |
| 7,620,018 B2 | 11/2009 | Tee et al. |
| 7,742,444 B2 | 6/2010 | Mese et al. |
| 7,768,960 B1 | 8/2010 | Barratt |
| 7,782,807 B2 | 8/2010 | Yoon et al. |
| 7,782,831 B1 | 8/2010 | Feeney |
| 7,818,013 B2 | 10/2010 | Li et al. |
| 7,852,793 B2 | 12/2010 | Prakash |
| 7,855,976 B2 | 12/2010 | Sampath |
| 7,881,245 B2 | 2/2011 | Vijayan et al. |
| 7,924,800 B2 | 4/2011 | Sampath |
| 7,933,219 B2 | 4/2011 | Naguib |
| 7,957,483 B2 | 6/2011 | Yu et al. |
| 7,987,505 B2 | 7/2011 | Vadlapudi et al. |
| 8,000,257 B2 | 8/2011 | An et al. |
| 8,000,407 B2 | 8/2011 | Prakash |
| 8,014,749 B2 | 9/2011 | Prakash |
| 8,027,302 B2 | 9/2011 | Prakash et al. |
| 8,032,145 B2 | 10/2011 | Ji |
| 8,036,669 B2 | 10/2011 | Dong et al. |
| 8,078,135 B2 | 12/2011 | Prakash et al. |
| 8,089,893 B2 | 1/2012 | Naguib |
| 8,107,421 B2 | 1/2012 | Prakash et al. |
| 8,169,889 B2 | 5/2012 | Walton et al. |
| 8,184,574 B2 | 5/2012 | Sutivong et al. |
| 8,199,661 B2 | 6/2012 | Barriac |
| 8,218,479 B2 | 7/2012 | Barriac |
| 8,238,289 B2 | 8/2012 | Prakash et al. |
| 8,248,950 B2 | 8/2012 | Ulupinar et al. |
| 8,265,066 B2 | 9/2012 | Prakash et al. |
| 8,265,179 B2 | 9/2012 | Okazaki |
| 8,289,897 B2 | 10/2012 | Ulupinar et al. |
| 8,289,908 B2 | 10/2012 | Barriac |
| 8,326,330 B2 | 12/2012 | Prakash et al. |
| 8,331,285 B2 | 12/2012 | Prakash |
| 8,411,621 B2 | 4/2013 | Barriac |
| 8,457,042 B2 | 6/2013 | Prakash et al. |

(56) References Cited

U.S. PATENT DOCUMENTS

| | | |
|---|---|---|
| 8,457,092 B2 | 6/2013 | Agrawal et al. |
| 8,477,808 B2 | 7/2013 | Prakash et al. |
| 8,520,628 B2 | 8/2013 | Teague et al. |
| 8,599,712 B2 | 12/2013 | Sampath |
| 2001/0029181 A1 | 10/2001 | Verkama |
| 2001/0034233 A1 | 10/2001 | Tiedemann, Jr. et al. |
| 2001/0054959 A1 | 12/2001 | Horn et al. |
| 2002/0003780 A1 | 1/2002 | Braun et al. |
| 2002/0018010 A1* | 2/2002 | Le ................................. 341/60 |
| 2002/0018450 A1 | 2/2002 | McKenna et al. |
| 2002/0022487 A1 | 2/2002 | Ahn |
| 2002/0037716 A1 | 3/2002 | McKenna et al. |
| 2002/0058528 A1 | 5/2002 | Hunzinger |
| 2002/0061749 A1 | 5/2002 | Hunzinger |
| 2002/0087720 A1* | 7/2002 | Davis et al. .................. 709/238 |
| 2002/0093920 A1 | 7/2002 | Neufeld et al. |
| 2002/0101837 A1 | 8/2002 | Bender et al. |
| 2002/0111158 A1 | 8/2002 | Tee |
| 2002/0123358 A1 | 9/2002 | Butler et al. |
| 2002/0126641 A1 | 9/2002 | Bender |
| 2002/0136286 A1 | 9/2002 | Koo |
| 2002/0137535 A1 | 9/2002 | Hunzinger |
| 2002/0142776 A1 | 10/2002 | Tiedemann, Jr. |
| 2002/0154610 A1 | 10/2002 | Tiedemann, Jr. et al. |
| 2002/0155852 A1 | 10/2002 | Bender |
| 2002/0163894 A1 | 11/2002 | Alapuranen et al. |
| 2002/0168984 A1 | 11/2002 | Wallentin |
| 2002/0181423 A1 | 12/2002 | Chen et al. |
| 2002/0181509 A1 | 12/2002 | Mody et al. |
| 2003/0016702 A1 | 1/2003 | Bender et al. |
| 2003/0031140 A1 | 2/2003 | Oprescu-Surcobe et al. |
| 2003/0039267 A1 | 2/2003 | Koo et al. |
| 2003/0058818 A1 | 3/2003 | Wilkes et al. |
| 2003/0072452 A1 | 4/2003 | Mody et al. |
| 2003/0086366 A1 | 5/2003 | Branlund et al. |
| 2003/0086385 A1 | 5/2003 | Kwon et al. |
| 2003/0112829 A1 | 6/2003 | Sridhar |
| 2003/0115369 A1 | 6/2003 | Walter et al. |
| 2003/0123383 A1 | 7/2003 | Korobkov et al. |
| 2003/0133494 A1 | 7/2003 | Bender et al. |
| 2003/0144000 A1 | 7/2003 | Glazko et al. |
| 2003/0152049 A1 | 8/2003 | Turner |
| 2003/0179727 A1 | 9/2003 | Soong et al. |
| 2003/0189932 A1 | 10/2003 | Ishikawa et al. |
| 2003/0207692 A1 | 11/2003 | Goldberg |
| 2003/0218973 A1 | 11/2003 | Oprea et al. |
| 2003/0232621 A1 | 12/2003 | Brooks |
| 2004/0002340 A1 | 1/2004 | Lim et al. |
| 2004/0038681 A1 | 2/2004 | Chun |
| 2004/0077370 A1 | 4/2004 | Dick et al. |
| 2004/0081131 A1 | 4/2004 | Walton et al. |
| 2004/0082356 A1 | 4/2004 | Walton et al. |
| 2004/0121771 A1 | 6/2004 | Song et al. |
| 2004/0121774 A1 | 6/2004 | Rajkotia et al. |
| 2004/0127244 A1 | 7/2004 | Matsumoto et al. |
| 2004/0143791 A1 | 7/2004 | Ito et al. |
| 2004/0146030 A1 | 7/2004 | Hsieh et al. |
| 2004/0151231 A1* | 8/2004 | Li et al. .......... 375/146 |
| 2004/0151264 A1 | 8/2004 | Montojo et al. |
| 2004/0152481 A1 | 8/2004 | Georgeaux et al. |
| 2004/0160922 A1 | 8/2004 | Nanda et al. |
| 2004/0174928 A1 | 9/2004 | Siwiak et al. |
| 2004/0180661 A1 | 9/2004 | Chen et al. |
| 2004/0185879 A1 | 9/2004 | Kong et al. |
| 2004/0193971 A1 | 9/2004 | Soong et al. |
| 2004/0203855 A1 | 10/2004 | Veerasamy et al. |
| 2004/0213214 A1 | 10/2004 | Jung et al. |
| 2004/0221218 A1 | 11/2004 | Grob et al. |
| 2004/0229605 A1 | 11/2004 | Hwang et al. |
| 2004/0252659 A1 | 12/2004 | Yun et al. |
| 2004/0258096 A1 | 12/2004 | Yoon et al. |
| 2004/0259528 A1 | 12/2004 | Gandhi et al. |
| 2004/0264548 A1 | 12/2004 | Miyoshi |
| 2005/0002370 A1 | 1/2005 | An et al. |
| 2005/0030911 A1 | 2/2005 | Tiedemann, Jr. et al. |
| 2005/0031047 A1 | 2/2005 | Maltsev et al. |
| 2005/0047361 A1 | 3/2005 | Fudim et al. |
| 2005/0049013 A1 | 3/2005 | Chang et al. |
| 2005/0054389 A1 | 3/2005 | Lee et al. |
| 2005/0058089 A1 | 3/2005 | Vijayan et al. |
| 2005/0063298 A1 | 3/2005 | Ling et al. |
| 2005/0078641 A1 | 4/2005 | Kim |
| 2005/0094576 A1 | 5/2005 | Fonseca et al. |
| 2005/0111397 A1 | 5/2005 | Attar et al. |
| 2005/0111406 A1 | 5/2005 | Pasanen et al. |
| 2005/0113023 A1 | 5/2005 | Bassompiere et al. |
| 2005/0117537 A1 | 6/2005 | Okabe |
| 2005/0118981 A1 | 6/2005 | Laroia et al. |
| 2005/0124358 A1 | 6/2005 | Willey |
| 2005/0124362 A1 | 6/2005 | Pecen et al. |
| 2005/0128964 A1 | 6/2005 | Tiedemann, Jr. et al. |
| 2005/0128993 A1 | 6/2005 | Yu et al. |
| 2005/0135282 A1 | 6/2005 | Miyoshi et al. |
| 2005/0135308 A1 | 6/2005 | Vijayan et al. |
| 2005/0135403 A1 | 6/2005 | Ketchum et al. |
| 2005/0152328 A1 | 7/2005 | Sadri et al. |
| 2005/0157802 A1 | 7/2005 | Park et al. |
| 2005/0163258 A1 | 7/2005 | Gore et al. |
| 2005/0164709 A1 | 7/2005 | Balasubramanian et al. |
| 2005/0165949 A1 | 7/2005 | Teague |
| 2005/0180312 A1 | 8/2005 | Walton et al. |
| 2005/0180362 A1 | 8/2005 | Chin et al. |
| 2005/0182779 A1* | 8/2005 | Perry et al. ..................... 707/101 |
| 2005/0190724 A1 | 9/2005 | Hansen et al. |
| 2005/0201309 A1 | 9/2005 | Kang et al. |
| 2005/0221833 A1 | 10/2005 | Granzow et al. |
| 2005/0232181 A1 | 10/2005 | Park et al. |
| 2005/0233729 A1 | 10/2005 | Stojanovski et al. |
| 2005/0249181 A1 | 11/2005 | Vijayan et al. |
| 2005/0249187 A1 | 11/2005 | Cho et al. |
| 2005/0265346 A1 | 12/2005 | Ho et al. |
| 2005/0266846 A1 | 12/2005 | Kim |
| 2005/0271027 A1 | 12/2005 | Kim et al. |
| 2005/0281226 A1 | 12/2005 | Lee et al. |
| 2005/0281269 A1 | 12/2005 | Choi |
| 2006/0014542 A1 | 1/2006 | Khandekar et al. |
| 2006/0018249 A1 | 1/2006 | Shearer et al. |
| 2006/0019677 A1 | 1/2006 | Teague et al. |
| 2006/0019694 A1 | 1/2006 | Sutivong et al. |
| 2006/0034208 A1 | 2/2006 | Blouin |
| 2006/0034244 A1 | 2/2006 | Huang et al. |
| 2006/0046762 A1 | 3/2006 | Yoon et al. |
| 2006/0050637 A1 | 3/2006 | Wigard et al. |
| 2006/0062183 A1 | 3/2006 | Forte et al. |
| 2006/0072508 A1 | 4/2006 | Zou et al. |
| 2006/0084432 A1 | 4/2006 | Balasubramanian et al. |
| 2006/0098599 A1 | 5/2006 | Choi et al. |
| 2006/0099972 A1 | 5/2006 | Nair et al. |
| 2006/0129816 A1 | 6/2006 | Hinton |
| 2006/0133409 A1 | 6/2006 | Prakash et al. |
| 2006/0135169 A1 | 6/2006 | Sampath et al. |
| 2006/0146757 A1* | 7/2006 | Harris ........................... 370/335 |
| 2006/0148493 A1 | 7/2006 | Narasimha et al. |
| 2006/0156365 A1 | 7/2006 | Zhang et al. |
| 2006/0183483 A1 | 8/2006 | Hidaka |
| 2006/0187877 A1 | 8/2006 | Lundby et al. |
| 2006/0193287 A1 | 8/2006 | Ooshima et al. |
| 2006/0194581 A1 | 8/2006 | Kang et al. |
| 2006/0205413 A1 | 9/2006 | Teague |
| 2006/0221883 A1 | 10/2006 | Damnjanovic et al. |
| 2006/0223449 A1 | 10/2006 | Sampath et al. |
| 2006/0227891 A1 | 10/2006 | Niu et al. |
| 2006/0245425 A1 | 11/2006 | Mathis et al. |
| 2006/0268768 A1 | 11/2006 | Harris et al. |
| 2006/0280160 A1 | 12/2006 | Padovani et al. |
| 2006/0285485 A1 | 12/2006 | Agrawal et al. |
| 2006/0285558 A1 | 12/2006 | Dottling et al. |
| 2006/0286974 A1 | 12/2006 | Gore et al. |
| 2006/0291577 A1 | 12/2006 | Boariu |
| 2007/0003113 A1* | 1/2007 | Goldberg ....................... 382/118 |
| 2007/0015523 A1 | 1/2007 | Prakash et al. |
| 2007/0022441 A1 | 1/2007 | Nystrom et al. |
| 2007/0060126 A1 | 3/2007 | Taniguchi et al. |
| 2007/0064588 A1 | 3/2007 | Kisoda et al. |

(56) References Cited

U.S. PATENT DOCUMENTS

| | | |
|---|---|---|
| 2007/0076682 A1 | 4/2007 | Kim et al. |
| 2007/0087767 A1 | 4/2007 | Pareek et al. |
| 2007/0091817 A1 | 4/2007 | Yoon et al. |
| 2007/0097935 A1 | 5/2007 | Gorokhov et al. |
| 2007/0110000 A1 | 5/2007 | Abedi |
| 2007/0121535 A1 | 5/2007 | Chen et al. |
| 2007/0133476 A1 | 6/2007 | Li et al. |
| 2007/0147226 A1 | 6/2007 | Khandekar et al. |
| 2007/0159957 A1 | 7/2007 | Ljung et al. |
| 2007/0217387 A1 | 9/2007 | Choi et al. |
| 2008/0056183 A1 | 3/2008 | Gorokhov et al. |
| 2008/0056188 A1 | 3/2008 | Lu et al. |
| 2008/0076432 A1 | 3/2008 | Senarath et al. |
| 2008/0117842 A1 | 5/2008 | Rao |
| 2008/0123542 A1 | 5/2008 | Karlsson |
| 2008/0187064 A1 | 8/2008 | Miyoshi |
| 2008/0188214 A1 | 8/2008 | Qi |
| 2008/0259811 A1 | 10/2008 | Cordeiro et al. |
| 2008/0271138 A1 | 10/2008 | Chen et al. |
| 2008/0293421 A1 | 11/2008 | Ulupinar et al. |
| 2008/0310357 A1 | 12/2008 | Ulupinar et al. |
| 2008/0311908 A1 | 12/2008 | Prakash et al. |
| 2009/0034445 A1 | 2/2009 | Prakash et al. |
| 2009/0046640 A1 | 2/2009 | Prakash et al. |
| 2009/0046699 A1 | 2/2009 | Prakash |
| 2009/0067547 A1 | 3/2009 | Ulupinar et al. |
| 2009/0086758 A1 | 4/2009 | Prakash et al. |
| 2009/0097437 A1 | 4/2009 | Sutivong et al. |
| 2009/0098841 A1 | 4/2009 | Prakash et al. |
| 2009/0103507 A1 | 4/2009 | Gu et al. |
| 2009/0129325 A1 | 5/2009 | Prakash et al. |
| 2009/0135768 A1 | 5/2009 | Barriac |
| 2009/0147693 A1 | 6/2009 | Teague et al. |
| 2009/0147712 A1 | 6/2009 | Prakash et al. |
| 2009/0147713 A1 | 6/2009 | Prakash |
| 2009/0147729 A1 | 6/2009 | Ulupinar et al. |
| 2009/0147730 A1 | 6/2009 | Ulupinar et al. |
| 2009/0147739 A1 | 6/2009 | Barriac |
| 2009/0149172 A1 | 6/2009 | Prakash et al. |
| 2009/0156207 A1 | 6/2009 | Prakash |
| 2009/0161775 A1 | 6/2009 | Prakash et al. |
| 2009/0164609 A1 | 6/2009 | Prakash et al. |
| 2009/0164658 A1 | 6/2009 | Prakash |
| 2009/0175217 A1 | 7/2009 | Prakash |
| 2009/0180424 A1 | 7/2009 | Prakash et al. |
| 2009/0201833 A1 | 8/2009 | Khandekar |
| 2009/0207744 A1 | 8/2009 | Ulupinar et al. |
| 2009/0207790 A1 | 8/2009 | Ulupinar et al. |
| 2009/0207830 A1 | 8/2009 | Prakash |
| 2009/0213788 A1 | 8/2009 | Prakash et al. |
| 2009/0213789 A1 | 8/2009 | Khandekar et al. |
| 2009/0213790 A1 | 8/2009 | Barriac |
| 2009/0213791 A1 | 8/2009 | Prakash |
| 2009/0219840 A1 | 9/2009 | Barriac |
| 2009/0219845 A1 | 9/2009 | Prakash |
| 2009/0219857 A1 | 9/2009 | Barriac et al. |
| 2009/0219866 A1 | 9/2009 | Prakash et al. |
| 2009/0219867 A1 | 9/2009 | Barriac |
| 2009/0219887 A1 | 9/2009 | Barriac |
| 2009/0219917 A1 | 9/2009 | Prakash et al. |
| 2009/0220033 A1 | 9/2009 | Palanki et al. |
| 2009/0221305 A1 | 9/2009 | Ulupinar et al. |
| 2009/0222698 A1 | 9/2009 | Prakash et al. |
| 2009/0258648 A1 | 10/2009 | Willey |
| 2009/0303890 A1 | 12/2009 | Prakash |
| 2009/0305664 A1 | 12/2009 | Prakash |
| 2009/0316632 A1 | 12/2009 | Prakash |
| 2010/0002597 A1 | 1/2010 | Sampath et al. |
| 2010/0034101 A1 | 2/2010 | Ayman Naguib |
| 2010/0046423 A1 | 2/2010 | Prakash et al. |
| 2010/0069107 A1 | 3/2010 | Mese et al. |
| 2010/0110976 A1 | 5/2010 | Prakash et al. |
| 2010/0150106 A1 | 6/2010 | Barriac |
| 2010/0215030 A1 | 8/2010 | Agrawal et al. |
| 2010/0232293 A1 | 9/2010 | Sagfors et al. |
| 2011/0173464 A1 | 7/2011 | Prakash et al. |
| 2011/0199996 A1 | 8/2011 | Zhang et al. |
| 2011/0280183 A1 | 11/2011 | Sampath |
| 2013/0010755 A1 | 1/2013 | Barriac |
| 2014/0022946 A1 | 1/2014 | Sampath |

FOREIGN PATENT DOCUMENTS

| | | |
|---|---|---|
| CN | 1350730 A | 5/2002 |
| CN | 1496636 | 5/2004 |
| CN | 1666448 A | 9/2005 |
| EP | 0475698 A2 | 3/1992 |
| EP | 0687078 A2 | 12/1995 |
| EP | 0869647 A2 | 10/1998 |
| EP | 0955736 A2 | 11/1999 |
| EP | 1004217 | 5/2000 |
| EP | 1052866 | 11/2000 |
| EP | 1124347 A2 | 8/2001 |
| EP | 1158685 A1 | 11/2001 |
| EP | 1202591 A2 | 5/2002 |
| EP | 1223775 | 7/2002 |
| EP | 1315310 A2 | 5/2003 |
| EP | 1388964 A1 | 2/2004 |
| EP | 1458209 A2 | 9/2004 |
| EP | 1471760 A2 | 10/2004 |
| EP | 1496632 A1 | 1/2005 |
| EP | 1513282 A2 | 3/2005 |
| EP | 1534039 | 5/2005 |
| EP | 1587233 | 10/2005 |
| EP | 1678906 A1 | 7/2006 |
| EP | 1714416 | 10/2006 |
| EP | 1583309 B1 | 5/2007 |
| EP | 1949730 | 7/2008 |
| EP | 1487230 | 9/2010 |
| JP | 0722998 | 1/1995 |
| JP | 7504552 T | 5/1995 |
| JP | 7226724 A2 | 8/1995 |
| JP | 8172671 | 7/1996 |
| JP | 8242218 A | 9/1996 |
| JP | 9509547 | 9/1997 |
| JP | 10155179 A | 6/1998 |
| JP | 10242903 A | 9/1998 |
| JP | 11313370 A | 11/1999 |
| JP | 2000506343 A | 5/2000 |
| JP | 2000232688 A | 8/2000 |
| JP | 2001512638 T | 8/2001 |
| JP | 2001274767 | 10/2001 |
| JP | 2002010341 A | 1/2002 |
| JP | 2002026795 A | 1/2002 |
| JP | 2002152129 A | 5/2002 |
| JP | 2002158609 A | 5/2002 |
| JP | 2002300628 | 10/2002 |
| JP | 2002305534 A | 10/2002 |
| JP | 2002539707 | 11/2002 |
| JP | 2002540692 | 11/2002 |
| JP | 2003500891 T | 1/2003 |
| JP | 2003511962 T | 3/2003 |
| JP | 2003110582 A | 4/2003 |
| JP | 2003517741 T | 5/2003 |
| JP | 2003525555 | 8/2003 |
| JP | 2003309533 | 10/2003 |
| JP | 2004088180 A | 3/2004 |
| JP | 2004153619 A | 5/2004 |
| JP | 2004159235 | 6/2004 |
| JP | 2004517534 T | 6/2004 |
| JP | 2004247801 A | 9/2004 |
| JP | 2004247985 A | 9/2004 |
| JP | 2004530347 | 9/2004 |
| JP | 2004531124 | 10/2004 |
| JP | 2004532542 A | 10/2004 |
| JP | 2004328772 | 11/2004 |
| JP | 2005012806 A | 1/2005 |
| JP | 2005502218 T | 1/2005 |
| JP | 2005080312 A | 3/2005 |
| JP | 2005508588 | 3/2005 |
| JP | 2005101990 A | 4/2005 |
| JP | 2005514865 T | 5/2005 |
| JP | 2005149303 A | 6/2005 |
| JP | 2005160079 A | 6/2005 |

(56) References Cited

FOREIGN PATENT DOCUMENTS

| | | | |
|---|---|---|---|
| JP | 2005233621 A | 9/2005 | |
| JP | 2005286998 A | 10/2005 | |
| JP | 2006511132 A | 3/2006 | |
| JP | 2006523392 A | 10/2006 | |
| JP | 2007501580 T | 1/2007 | |
| JP | 4746096 | 5/2011 | |
| KR | 20010016706 | 3/2001 | |
| KR | 1020010082061 | 8/2001 | |
| KR | 1020030007481 | 1/2003 | |
| KR | 20040007214 | 1/2004 | |
| KR | 20040050145 | 6/2004 | |
| KR | 20050053787 | 6/2005 | |
| KR | 20060014618 A | 2/2006 | |
| RU | 2073913 | 2/1997 | |
| RU | 2198465 C2 | 9/2002 | |
| TW | 478269 | 3/2002 | |
| TW | 531982 | 5/2003 | |
| TW | 200302642 | 8/2003 | |
| TW | I223532 | 11/2004 | |
| TW | I223944 | 11/2004 | |
| TW | 200501641 | 1/2005 | |
| TW | I239782 | 9/2005 | |
| TW | I240524 | 9/2005 | |
| WO | WO9318601 A1 | 9/1993 | |
| WO | WO9730531 A1 | 8/1997 | |
| WO | WO9733399 | 9/1997 | |
| WO | 9854919 | 3/1998 | |
| WO | WO9835520 | 8/1998 | |
| WO | WO9839938 | 9/1998 | |
| WO | WO9848581 A1 | 10/1998 | |
| WO | WO9943101 | 8/1999 | |
| WO | WO0007260 A2 | 2/2000 | |
| WO | WO0010353 A1 | 2/2000 | |
| WO | WO0013451 | 3/2000 | |
| WO | WO0014900 A1 | 3/2000 | |
| WO | WO0018173 | 3/2000 | |
| WO | WO0035107 | 6/2000 | |
| WO | 0057662 | 9/2000 | |
| WO | WO0055976 A2 | 9/2000 | |
| WO | WO0057663 | 9/2000 | |
| WO | WO0113669 A1 | 2/2001 | |
| WO | WO0117288 A1 | 3/2001 | |
| WO | WO0120808 A2 | 3/2001 | |
| WO | 0131887 A1 | 5/2001 | |
| WO | WO0160104 | 8/2001 | |
| WO | WO0176110 A2 | 10/2001 | |
| WO | WO0176279 | 10/2001 | |
| WO | WO0182504 | 11/2001 | |
| WO | WO0197538 | 12/2001 | |
| WO | WO0228120 A2 | 4/2002 | |
| WO | WO0243412 | 5/2002 | |
| WO | WO0247321 | 6/2002 | |
| WO | WO0249305 | 6/2002 | |
| WO | WO02073867 | 9/2002 | |
| WO | WO02080600 | 10/2002 | |
| WO | WO02093839 | 11/2002 | |
| WO | WO03015435 | 2/2003 | |
| WO | WO03043251 | 5/2003 | |
| WO | WO03051076 | 6/2003 | |
| WO | WO03069933 | 8/2003 | |
| WO | WO2004004173 | 1/2004 | |
| WO | WO2004032548 A1 | 4/2004 | |
| WO | WO2004032559 | 4/2004 | |
| WO | WO2004038984 A2 | 5/2004 | |
| WO | WO2004038988 | 5/2004 | |
| WO | WO2004054206 A1 | 6/2004 | |
| WO | 2004057897 A1 | 7/2004 | |
| WO | WO2004073200 | 8/2004 | |
| WO | WO2004077752 | 9/2004 | |
| WO | WO2004077778 A1 | 9/2004 | |
| WO | WO2004079949 A1 | 9/2004 | |
| WO | WO2004082181 A1 | 9/2004 | |
| WO | WO2004086711 | 10/2004 | |
| WO | WO2004091231 A1 | 10/2004 | |
| WO | WO2004100450 A1 | 11/2004 | |
| WO | WO2004107796 A1 | 12/2004 | |
| WO | WO2005004525 | 1/2005 | |
| WO | WO2005022811 | 3/2005 | |
| WO | WO2005027355 A2 | 3/2005 | |
| WO | WO2005034438 | 4/2005 | |
| WO | WO2005039128 | 4/2005 | |
| WO | 2005048517 A1 | 5/2005 | |
| WO | WO2005041515 | 5/2005 | |
| WO | WO2005055640 A1 | 6/2005 | |
| WO | WO2005060277 | 6/2005 | |
| WO | WO2005064875 | 7/2005 | |
| WO | WO2005067173 A1 | 7/2005 | |
| WO | WO2005067181 A1 | 7/2005 | |
| WO | 2005074184 | 8/2005 | |
| WO | WO2005071989 | 8/2005 | |
| WO | WO2005079081 A1 | 8/2005 | |
| WO | WO2005081444 A1 | 9/2005 | |
| WO | WO2005096560 A1 | 10/2005 | |
| WO | WO2006007318 A1 | 1/2006 | |
| WO | WO2006023705 | 3/2006 | |
| WO | 2006069176 A2 | 6/2006 | |
| WO | WO2006069320 | 6/2006 | |
| WO | WO2006099062 A1 | 9/2006 | |
| WO | 2006109492 | 10/2006 | |
| WO | WO2006138556 | 12/2006 | |
| WO | WO2006138573 | 12/2006 | |
| WO | WO2007050876 | 5/2007 | |
| WO | WO2007050939 | 5/2007 | |

OTHER PUBLICATIONS

Written Opinion—PCT/US2006/23587—International Search Authority/US—Jan. 11, 2007.
International Preliminary Report on Patentability—PCT/US2006/23587—Dec. 17, 2007.
3GPP2 C: "cdma2000 High Rate Packet Data Air Interface Specification; 3GPP2 C S0024-A version 2.0," 3GPP2 CDMA2000, Jul. 2005, 43 pages, XP002422601.
3GPP2 C: "cdma2000 High Rate Packet Data Air Interface Specification", 3GPP2 C. S0024-A version 2.0, 3GPP2 CDMA2000, May 2006, 1621 pages.
3GPP2 C.S0024-A, "cdma 2000 High Rate Packet Data Air Interface Specification" Version 2.0, 7-18, 8-29, 8-36, 8-38-8-39, 8-41,8-155-8-156, 10-1, Jul. 2005.
3GPP2 C.S0024-A, "CDMA 2000 High Rate Packet Data Air Interface Specification", Version 2.0, 8-15, 8-43, Jul. 2005.
3GPP2 C. S0024-A, "CDMA 2000 High Rate Packet Data Air Interface Specification", Version 2.0, 8-151-8-155, Jul. 2005.
3GPP2 C.S0038-A: "Signaling Conformance Specification for High Rate Packet Data Air Interface"; Sep. 26, 2005.
3GPP2: "cdma 2000 High Rate Packet Data Air Interface Specification", 3rd Generation Partnership Project 2,3GPP2 C.S0024-A Version 2,0, pp. 8-25-8-28.
3GPP2: "cdma 2000 High Rate Packet Data Air Interface Specification", 3GPP2 C.S0024-A, Jul. 2005, Version 2.0, pp. 8-26, 8-38.
3GPP2: "cdma 2000 High Rate Packet Data Air Interface Specification", 3GPP2 C.S0024-A, Sep. 2000, Version 2.0, p. 6-7-6-8.
3GPP2: "cdma2000 High Rate Packet Date Air Interface Specification", Version 2.0, 3GPP2 C.S0024-A, 8-68-8-69, Jul. 2005.
Chinese OA dated Jul. 29, 2011 for Chinese Application Serial No. 200680049699.4, 12 pages.
Chinese Office Action dated May 31, 2011 for Chinese Patent Application No. 200680049838.3, 4 pages.
Chinese Office Action dated Aug. 2, 2011, for Chinese Patent Application Serial No. 200680049384.2, 5 pages.
Chinese Office Action dated Sep. 6, 2011, for Chinese Patent Application Serial No. 200680049464.5, 7 pages.
Chinese Office Action dated Aug. 18, 2011 for CN Patent Application Serial No. 200680049802.5, 7 pages.
Chinese Office Action dated Aug. 23, 2011 for Chinese Patent Application No. 200680049251.2, 6 pages.
Chinese Office Action dated Aug. 3, 2011 for Chinese Patent Application Serial No. 200680049492.7, 7 pages.
Chinese Office Action dated Aug. 31, 2011, for Chinese Patent Application Serial No. 200680049274.3, 8 pages.

(56) References Cited

OTHER PUBLICATIONS

Chinese Office Action dated Jan. 11, 2011, for Chinese Patent Application Serial No. 200680049428.9, 4 pages.
Chinese Office Action dated Jul. 14, 2010, mailed Sep. 27, 2010 for Chinese Patent Application Serial No. 200680049428.9, 4 pages.
Chinese Office Action dated Jun. 27, 2011 for Chinese Patent Application Serial No. 200680049300.2, 4 pages.
Chinese Office Action dated Jun. 29, 2011 for CN Application Serial No. 200680049453.7, 4 pages.
Chinese Office Action dated May 11, 2011, for Chinese Patent Application Serial No. 200680049428.9, 6 pages.
Chinese Office Action for CN Application Serial No. 200680049677.8 dated Jul. 13, 2011, 9 pages.
Chinese office Action mailed Jun. 22, 2011, for Chinese Patent Application Serial No. 200680049400.5, 4 pages.
CN OA dated Jul. 22, 2011 for CN Application Serial No. 200680049332.2, 13 pages.
CN OA for Chinese Application No. 200680049630.1 dated Aug. 5, 2011, 4 pages.
CN Office Action dated Aug. 3, 2011 for CN Patent Application Serial No. 200680049352.X, 10 pages.
English Translation of Japanese Office Action for Japanese Patent Application No. 2008-537984, dated Sep. 13, 2011 7 pages.
EP OA for EP Application No. 06826942.2 dated Jun. 14, 2011, 5 pages.
European Office Action dated Aug. 11, 2011 for European Patent Application Serial No. 06826727.7, 6 pages.
European Office Action dated Aug. 11, 2011 for EP Application No. 06817411.9; 7 pages.
European Office Action dated Sep. 24, 2010 for European Patent Application Serial No. 06826918.2, 4 pages.
European Office Action for European Patent Application No. 06 817 413.5-2412, dated Aug. 11, 2011, 7 pages.
European Office Action from European Application No. 06 827 128.7-2412 dated Aug. 11, 2011.
Japanese OA mailed May 31, 2011 for Japanese Application Serial No. 2008-538097 , 2 pages.
Japanese Office Action dated Aug. 23, 2011, for Japanese Patent Application Serial No. 2008-538025, 3 pages.
Japanese Office Action dated Aug. 30, 2011 for Japanese Patent Application Serial No. 2008-538023, 3 pages.
Japanese Office Action dated Aug. 16, 2011 for Japanese Patent Application No. 2008-537969, 1 page.
Japanese Office Action dated Feb. 8, 2011 for Japanese Patent Application Serial No. 2008538082, 3 pages.
Japanese Office Action dated Jul. 26, 2011 for Japanese Application Serial No. 2008-538106, 4 pages.
Japanese Office Action dated Jun. 21, 2011 for JP Application No. 2008-537970; 3 pages.
Japanese Office Action dated Mar. 1, 2011 for Japanese Patent Application Serial No. 2008-538023, 3 pages.
Japanese Office Action dated Sep. 6, 2011 for Japanese Patent Application Serial No. 2008538082, 7 pages.
Japanese Office Action from JP Patent Application No. 2008-538084, dated Aug. 23, 2011, 2 pages.
Jim Tomcik, "C80220-05169: QFDD and QTDD: Proposed Draft Air Interface Specification" IEEE : Contributions to IEEE 80220 session 17: Nov. 14-17, 2005 dated Oct. 28, 2005 XP002422600 http://ieee802org/20/Contributions.html Last accessed Mar. 1, 2007.
JP OA mailed Aug. 23, 2011, for JP Application Serial No. 2008538068, 6 pages.
JP Office Action dated Aug. 2, 2011, for Japanese Patent Application No. 2008-538069, 2 pages.
Korean Office Action dated Jul. 29, 2011 for Korean Patent Application Serial No. 2010-7024469, 3 pages.
Office Action dated Mar. 29, 2011 for Japanese Patent Application No. 2008-537978, 9 pages.
Office Action for Chinese Patent Application No. 200680049746.5 dated Sep. 15, 2011, 5 pages.
Office Action mailed Jan. 29, 2010 for Korean Patent Application No. 2008-7012765, 3 pages.
Supplementary European Search Report—EP06773404—Search Authority—Hague—Jun. 24, 2011.
Translation of Office Action for Chinese Patent Application No. 200680049832.6 dated Jul. 19, 2011, 4 pages.
3GPP, ETSI: Universal Mobile Telecommunications system (UMTS); Radio Resource Control (RRC); Protocol specification (3GPP TS 25.331 version 7.2.0 Release 7). ETSI TS 125 331 V.7.2.0, Sep. 2006, XP002423759.
3GPP2 "cdma2000 High Rate Packet Data Air interface Specification",3rd Generation Partnership Project 2 C.S0024, Sep. 12, 2000, pp. 1-417.
3GPP2 C: "cdma2000 High Rate Packet Data Air Interface Specification; 3GPP2 C.S0024-A version 2.0," 3GPP2 CDMA2000, Jul. 2005, p. 0, 8-13-8-15, 8-101, XP002426056, p. 8-13, line 17-line 35; p. 8-14, line 15-line 32; p. 8-15, line 4-line 12; p. 8-101, line 30-line 32.
3GPP2. "cdma2000 High Rate Packet Data Air Interface Specification", Chapter 9—"Connection Layer", C.S0024-A, Version 1.0, Mar. 2004, 144 pages, XP002424014.
3GPP2, "cdma2000 High Rate Packet Data Air Interface Specification", C. S0024-A Version 2.0, Oct. 27, 2000, 441 pages.
3GPP2 C.S0024-0-Version 4.0 "cdma2000 High Rate Packet Data Air Interface Specification", p. 1-548, Oct. 25, 2002.
3GPP2 C.S0024-A V2.0, Jul. 2005, p. 8-11-8-12, 8-29-8-31, (for information: p. 8-86-8-87, 8-101).
3GPP2 C.S0024-A V2.0, Jul. 2005, pp. 8-10 to 8-12, 8-29 to 8-32, 8-86 to 8-87, 8-106, and 8-168.
3GPP2 C.S0024-A, Version 2.0—3rd Generation Partnership Project 2; "CDMA2000 High Rate Packet Data Air Interface Specification"; Jul. 2005, 1227 pages; XP002431799.
3GPP2. Medium Access Control (MAC) Standard for cdma2000 Spread Spectrum Systems, 3GPP2 C.S0003-D Version 1.0, p. '2-87'-'2.92, Feb. 13, 2004, published online at [http://www.3gpp2.org/Public_html/specs/C.S0003-D.v1.0_MAC_031504.pdf] 8 pages.
3rd Generation Partnership Project 2 "3GPP2": Medium Access Control (MAC) Standard for cdma2000 Spread Spectrum Systems, Release D'; 3GPP2 CS0003-D Version 2.0, Sep. 2005 (pp. 1-230) XP002429116.
3rd Generation Partnership Project 2 "3GPP2": "Signaling Link Access Control (LAC) Standard for cdma200 Spread Spectrum Systems Revision D v2.0" 3GPP2 C.S0004-D Version 2.0, Sep. 2005, XP002427509, pp. 1-12, pp. 2-46-pp. 2-51.
802.20 Evaluation Criteria—Ver. 1.0, IEEE 802 LANIMAN Standards Committee, Sep. 23, 2005, pp. 18-35,URL: [http://www.ieee802.org/20/P_Docs/IEEE_802.20-PD-09.doc].
Agilent Technologies: Performing Base Station Over—Air Maintenance with the Agilent E6474A CDMA , Mar. 2002, XP002423351, retrieved from the internet on Mar. 6, 2007, pp. 16-17, 23. http://cp.literature.agilent.com/litweb/pdf/E6474-90042.pdf. Last accessed May 23, 2008, 33 pages.
cdma2000 High Rate Packet Data Air Interface Specification, 3GPP2 C.S0024-A, Jul. 2005, Version 2.0, p. 8-151,8-157-8-169, section 8.9.1 and 8.9.6.2.1, URL, http://www.3gpp2.org/Public_html/specs/C.50024-A_v2.0_050727.pdf.
cdma2000 High Rate Packet Data Air Interface Specification, 3GPP2 C.S0024-A Version 2.0, Jul. 2005, p. 8-97-8-114, URL , http ://www.3gpp2 .org/Public_html/specs/C.S0024-Av2.0_050727.pdf.
Chinese OA dated Nov. 30, 2010 for CN Applcation Serial No. 200680049404.3, 8 pages.
Chinese OA dated Jan. 19, 2011 for Chinese Application Serial No. 200680049699.4, 11 pages.
Chinese OA for CN Application No. 200680049464.5, mailed Jan. 10, 2011, 5 pages.
Chinese Office Action dated Nov. 12, 2010 for Chinese Patent Application Serial No. 200680049463.0, 7 pages.
Chinese Office Action dated Nov. 9, 2010, mailed Jan. 12, 2011, for Chinese Patent Application Serial No. 200680049589.8, 8 pages.
Chinese Office Action dated Dec. 31, 2010, for Chinese Patent Application Serial No. 200680049364.2, 5 pages.
Chinese Office Action dated Apr. 27, 2011 for Chinese Patent Application Serial No. 200680049463.0, 7 pages.

(56) References Cited

OTHER PUBLICATIONS

Chinese Office Action dated Apr. 20, 2011 for CN Application No. 200680049600.0; 11 pages.
Chinese Office Action dated Apr. 26, 2011, for Chinese Patent Application Serial No. 200680049310.6, 6 pages.
Chinese Office Action dated Dec. 24, 2010 for Chinese Patent Application No. 200680049284.7, 5 pages.
Chinese Office Action dated Dec. 27, 2010 for Chinese Patent Application Serial No. 200680049300.2, 2 pages.
Chinese Office Action dated Dec. 31, 2010 for Chinese Patent Application Serial No. 200680049680.X, 9 pages.
Chinese Office Action dated Feb. 18, 2011, for Chinese Patent Application Serial No. 200680049274.3, 6 pages.
Chinese Office Action dated Feb. 18, 2011 for CN Patent Application Serial No. 200680049802.5, 7 pages.
Chinese Office Action dated Jan. 20, 2011 for Chinese Patent Application No. 200680049251.2.
Chinese Office Action dated Jan. 26, 2011 for Chinese Patent Application Serial No. 200680049492.7, 5 pages.
Chinese Office Action dated Jan. 6, 2011 for Chinese Application Serial No. 200680049670.6, 4 pages.
Chinese Office Action dated Mar. 2, 2011 for CN Application Serial No. 200680049453.7, 4 pages.
Chinese Office Action dated Oct. 13, 2010, mailed Dec. 7, 2010, for Chinese Patent Application Serial No. 200680049771.3, 11 pages.
Chinese Office Action dated Sep. 6, 2010, for Chinese Patent Application Serial No. 200680049310.6, 5 pages.
Chinese Office Action for Chinese Application No. 200680049812.9 dated Jan. 25, 2011. 11pages.
Chinese Office Action for Chinese Application Serial No. 200680049342.6 dated Apr. 27, 2011, 6 pages.
Chinese Office Action for CN Application No. 200680049744.6 dated Sep. 9, 2010, 4 pages, Sep. 2010.
Chinese Office Action for CN Application Serial No. 200680049677.8 dated Jan. 26, 2011, 7 pages.
Chinese Office action mailed Sep. 8, 2010 for Chinese patent application No. 200680049451.8, 2 pages.
Chinese Office Action translation for Chinese Patent Application No. 200680049836.4, dated May 17, 2011. 9 pages.
CN OA dated Dec. 31, 2010 for CN Application Serial No. 200680049332.2, 27 pages.
CN OA for Chinese Application No. 200680049630.1 dated Dec. 31, 2010,7 pages.
CN Office Action for Chinese Application No. 200680049752.0 mailed Mar. 23, 2011, pp. 4.
CN Office Action mailed Jan. 6, 2011 for Chinese Patent Application No. 200680049640.5, 5 pages.
CN Office Action mailed Feb. 24, 2011 for Chinese Patent Application Serial No. 200680049352.X, 9 pages.
CN Office Action with English translation for CN application No. 200680049443.3 mailed Jan. 26, 2011, pp. 6.
CN Office Action with English translation for CN application No. 200680049740.8 mailed Mar. 16, 2011, pp. 5.
Damnjanovic and Vanghi, "IS-2000 Enhanced Closed Loop Power Control for Turbo Coding," IEEE 54th Vehicular Technology Proceedings, Oct. 7-11, 2001, pp. 2314-2318, XP-010562383.
English Translation of Japanese Office Action mailed Feb. 22, 2011 for Japanese Patent Application No. 2008-537965.
English Translation of Korean Office Action mailed Aug. 31, 2010 for Korean Patent Application No. 2008-7012604, 3 pages.
English Translation of the Chinese Office Action dated Aug. 31, 2010 for Chinese Patent Application Serial No. 2006-800494310, 2 pages.
EP OA dated Oct. 4, 2010 for European Application Serial No. 06827070.1, 4 pages.
EP OA dated Feb. 19, 2009 for EP Application Serial No. 06836638.4-24112 11 pages.
EP OA dated Feb. 20, 2009 for EP Application Serial No. 06 827 070.1-2412, 5 pages.
EP OA dated Mar. 17, 2009 for European Application No. 06 826 886.1-2412, 10 pages.
EP OA dated Mar. 17, 2009 for European Application No. 06 827 080.0-2412, 6 pages.
EP OA dated Oct. 4, 2010 for EP Application Serial No. 06836638.4, 4 pages.
EP OA for EP Application No. 06826942.2 dated Jan. 25, 2011,3 pages.
EP Office Action for European Patent Application 06836548.5 dated Mar. 3, 2010; pp. 4.
ETS 300744, Digital Video Broadcasting; Framing Structure, Channel Coding, and Modulation for digital Terrestrial Television, European Telecommunication Standards Institute (ETSI), Nov. 1996.
European OA dated Oct. 5, 2010 for European Application Serial No. 06836689.7-2412, 4 pages.
European OA dated Feb. 19, 2009 for European Application Serial No. 06 836 689.7-2412, 6 pages.
European OA dated Feb. 20, 2009 for European Application Serial No. 06 826 915.8-2412, 5 pages.
European OA dated May 14, 2009 for US Application Serial No. 06 826 883.8-1237 , 4 pages.
European OA dated Sep. 9, 2008 for EP Application Serial No. 06 826 733.5-2412 , 2 pages.
European OA dated May 14, 2009 for EP Application Serial No. 06 827 064A-1237, 4 pages.
European Office Action dated Dec. 19, 2008 for European Application No. 06 817409.3.
European Office Action dated Sep. 24, 2010, for European Patent Application Serial No. 06826919.0, 4 pages.
European Office Action dated Sep. 24, 2010, for European Patent Application Serial No. 06836656.6, 4 pages.
European Office Action Dated Aug. 21, 2008 for European Application Serial No. 068271782, 3 pages.
European Office Action dated Dec. 14, 2009, for European Patent Application Serial No. 06826816.8, 2 pages.
European Office Action dated Dec. 18, 2009, for European Patent Application Serial No. 06826807.7, 4 pages.
European Office Action dated Feb. 8, 2011 for EP Application Serial No. 06827064.4, 14 pages.
European Office Action dated Jun. 10, 2010 for European Patent Application Serial No. 06827080.0, 5 pages.
European Office Action dated Oct. 4, 2010, for European Patent Application Serial No. 06826853.1, 7 pages.
European Office Action dated Sep. 17, 2008, for European Patent Application Serial No. 06826807.7, 6 pages.
European Office Action dated Sep. 24, 2010, for EP Patent Application Serial No. 06826849.9, 4 pages.
European Office Action for European Application No. 06827130.3-2412 dated Sep. 24, 2010, 4 pages.
European Office Action mailed Sep. 24, 2010 for European Patent Application No. 06844225.0, 4 pages.
European Patent Office Action dated Apr. 12, 2010 for EP Application Serial No. 06817409.3, 4 pages.
European Search Report dated Jun. 16, 2011 for EP Application Serial No. 11167329.9, 6 pages.
European Search Report mailed Nov. 29, 2010 for European Application No. 10152463.5-2413, 6 pages.
Harada et al., "Investigations on BLER requirements of associated control channels for IP packet transmission in forward link for VSF-OFCDM broadband packet wireless access", Vehicular Technology Conference, 2004. VTC2004-Fall. 2004 IEEE 60th, Sep. 2004.
IEEE 802.20 Working Group on Mobile Broadband Wireless Access; QFDD and QTDD: Proposed Draft Air Interface Specification; IEEE C802.20-05/69, Oct. 28, 2005, retrieved from the internet on Mar. 5, 2007, pp. 6-43-6-44, XP002425098, http://ieee802.org/20/Contributions.html. Last accessed May 24, 2008, 624 pages.
IEEE: "Draft IEEE Standard for Local and metropolitan area networks, Part 16: Air Interface for Fixed Broadband WirelessAccess-Systems,chapters:6.3.2.3,6.3.15-6.3.17,8.2.1.4-8.2.1.11,8.3.5-8.4.5,8.4.11,11". IEEEP802.16-REVDID5, May 2004, XP002423445.
Japanese OA dated Dec. 21, 2010 for JP Application Serial No. 2008538094, 6 pages.
Japanese OA dated Dec. 7, 2010 for Japanese Application Serial No. 2008-538097, 3 pages.

(56) References Cited

OTHER PUBLICATIONS

Japanese OA dated Feb. 22, 2011 for JP Application Serial No. 2008-537946, 4 pages.
Japanese OA dated May 10, 2011 for JP Application Serial No. 2008-538094, 3 pages.
Japanese Office Action dated Mar. 1, 2011, for Japanese Patent Application Serial No. 2008-538025, 4 pages.
Japanese Office Action dated Dec. 7, 2010 for Japanese Patent Application Serial No. 2008-538002, 3 pages.
Japanese Office Action dated Feb. 15, 2011 for Japanese Patent Application No. 2008-537969.
Japanese Office Action dated Feb. 8, 2011, for Japanese Patent Application Serial No. 2008-537988, 5 pages.
Japanese Office Action dated Jan. 18, 2011 for JP Application No. 2008-537970; 5 pages.
Japanese Office Action dated Jan. 25, 2011 for Japanese Patent Application No. 2008537979, 5 pages.
Japanese Office Action dated Jan. 26, 2011, mailed Feb. 1, 2011, for Japanese Patent Application Serial No. 2008-537997, 2 pages.
Japanese Office Action dated Jan. 4, 2011 for Japanese Patent Application Serial No. 2008-537944, 4 pages.
Japanese Office Action dated Mar. 1, 2011, for Japanese Patent Application Serial No. 2008-537964, 6 pages.
Japanese Office Action dated Mar. 15, 2011 for Japanese Application Serial No. 2008-538106, 5 pages.
Japanese Office Action dated Mar. 15, 2011 for JP Patent Application Serial No. 2008-538022, 5 pages.
Japanese Office Action for Japanese Application No. 2008-538096 dated Feb. 8, 2011, 6 pages.
Japanese Office Action for Japanese Application Serial No. 2008-537996 dated Mar. 29, 2011, 6 pages.
Japanese Office Action mailed Dec. 7, 2010 for Japanese Patent Application Serial No. 2008-537990, 3 pages.
Japanese Office Action mailed Mar. 1, 2011, for JP Patent Application Serial No. 2008-538079, 6 pages.
Japanese Office Action mailed Dec. 21, 2010, for Japanese Patent Application Serial No. 2008-537985, 3 pages.
Jeon, et al., An enhanced channel-quality indication (CQI) reporting scheme for HSDPA systems, IEEE Communication letters, May 2005, vol. 9, pp. 432-434.
Jim Tomcik, "C802.20-05/69: QFDD and QTDD: Proposed Draft Air Interface Specification". Contributions to IEEE 802.20 Session 17: Nov. 14-17, 2005; Oct. 28, 2010; pp. 1-624; XP002423945. http://ieee802.org/20/Contributions.html.
Jim Tomcik, et al., MBFDD and MBTDD: Proposed Draft Air Interface Specification. IEEE 802.20 Working Group on Mobile Broadband Wireless Access, Jan. 6, 2006; pp. 1-839; XP002426594. http://www.ieee802.org/20/Contribs/C802.20-06-04.pdf.
Jim Tomcik "MBFDD and MBTDD Wideband Mode : Technology Overview" Jan. 6, 2006 (109 pages) XP002422172 Retrieved from the Internet : URL: http://www.ieee802.org/20/contributions.html >.
JP OA dated Mar. 1, 2011 for JP Application Serial No. 2008-538068, 4 pages.
JP OA for Japanese Application No. 2008-538033 dated Feb. 22, 2011, 2 pages.
JP Office Action for Japanese Application No. 2008-537980 dated Mar. 29, 2011, 4 pages.
JP Office Action for JP application No. 2008-537956 mailed Dec. 7, 2010, 3 pages.
JP Office Action from Japanese Patent Application No. 2008-538084 dated Mar. 29, 2011, pp. 6.
JP Office Action mailed Jan. 11, 2011 for Japanese Patent Application No. 2008-538069, 3 pages.
JP Office Action mailed Feb. 22. 2011 for Japanese Patent Application Serial No. 2008-537994, 5 pages.
JP Office Action with English translation for JP Application No. 2008-538014 mailed Mar. 15, 2011, pp. 11.
Korean OA Dated Nov. 25, 2009 for KR Application Serial No. 20087012719, 4 pages.
Korean OA dated Jan. 26, 2010 for KR Application Serial No. 2008-7012552, 2pages.
Korean OA dated Dec. 9, 2009 for Korean Application Serial No. 2008-7012459, 3 pages.
Korean OA dated May 26, 2010 for Korean Application Serial No. 2008-7012459, 3 pages.
Korean Office Action dated Feb. 26, 2010 for Korean Application No. 2008-7012769, 3 pages.
Korean Office Action dated Feb. 17, 2011 for Korean Patent Application Serial No. 2010-7029654, 3 pages.
Korean Office Action dated Apr. 28, 2010 for Korean Patent Application Serial No. 2008-7012762, 4 pages.
Korean Office Action Dated April 30, 2010 for Korean Application Serial No. 2008-7012462, 3 pages.
Korean Office Action dated Aug. 27, 2010 for Korean Patent Application Serial No. 2008-7012463, 3 pages.
Korean Office Action dated Aug. 27, 2010, for Korean Patent Application Serial No. 2008-7012474, 3 pages.
Korean Office Action dated Aug. 31, 2010 for Korean Patent Application Serial No. 2008-7012754, 3 pages.
Korean Office Action dated Aug. 31, 2010, for KR Patent Application Serial No. 2008-7012554, 3 pages.
Korean Office Action dated Dec. 24, 2009, for Korean Patent Application Serial No. 2008-7012465, 2 pages.
Korean Office Action dated Dec. 29, 2010 for Korean Patent Application Serial No. 2008-7012471, 3 pages.
Korean Office Action dated Dec. 9, 2009 for Korean Patent Application Serial No. 2008-7012471, 3 pages.
Korean Office Action dated Feb. 25, 2010 for Korean Patent Application Serial No. 2008-7012476, 4 pages.
Korean Office Action dated Feb. 25, 2010 for Korean Patent Application Serial No. 2008-7012754, 4 pages.
Korean Office Action dated Feb. 26, 2010, for KR Patent Application Serial No. 2008-7012554, 3 pages.
Korean Office Action dated Jan. 28, 2010 for Korean Patent Application Serial No. 2008-7012463, 4 pages.
Korean Office Action dated Jan. 28, 2010, for Korean Patent Application Serial No. 2008-7012474, 4 pages.
Korean Office Action dated Jan. 29, 2010, for Korean Patent Application Serial No. 2008-7012558, 3 pages.
Korean Office Action dated Jun. 28, 2010 for Korean Patent Application Serial No. 2008-7012471, 3 pages.
Korean Office Action Dated March 19, 2010, for Korean Patent Application Serial No. 2008-7012456, 4 Pages.
Korean Office Action dated Mar. 30, 2010 for Korean Application No. 2008-7012586; 3 pages.
Korean Office Action Dated March 30, 2010 for Korean Patent, Application Serial No. 2008/7012610, 3 Pages.
Korean Office Action dated Sep. 30, 2010 for Korean Application Serial No. 2010-7017046, 4 pages.
Korean Office Action for Korean Application No. 2008-7012687 dated Mar. 31, 2010, 4 pages.
Korean Office Action for Korean Application No. 2008-7012687 dated Sep. 30, 2010, 4 pages.
Korean Office Action for Korean Patent Application 2008-7012453 dated Jan. 27, 2010; pp. 3.
Korean Office Action for KR Application Serial No. 2008-7012764 dated May 19, 2010, 4 pages.
Korean Office Action for KR Application Serial No. 2008-7012764 dated Aug. 27, 2010, 3 pages.
Korean Office Action from Korean Patent Application No. 2008-7012724 dated Apr. 27, 2010, pp. 3.
Korowajczuk L., et al, "Designing cdma2000 Systems", John Wiley & Sons, Inc., 2004, 34 pages.
"KR OA dated Aug. 25, 2010 for Korean Application Serial No. 2008-7012480, 2 pages.".
KR OA dated Jan. 29, 2010 for KR Application Serial No. 2008-7012603, 5 pages.
KR OA dated Jun. 28, 2010 for KR Application Serial No. 2008-7012603, 5 pages.
Liu Dawei, et al., "A New Access Method Used in Beyond 3G Mobile System Using MC-CDMA" in International Conference on Communications, Circuits and Systems and West Sino Expositions, IEEE,

(56) References Cited

OTHER PUBLICATIONS

2002. Jun. 29-Jul. 1, 2002, Piscataway, NJ, USA. vol. 1, pp. 170-171, XP010632240, ISBN: 0-7803-7547-5.http://ieeexplore.ieee.org/ie15/8402/26511/01180596.pdf?tp=&arnumber=I180596&isnumber=26511. Last accessed May 23, 2008, 2 pages.

Lucent Technologies: "MIMO system integration and signalling in HSDPA" 3GPP TSG RAN WG1, R1-01-0305, [Online] Feb. 27, 2001, XP002428085 Las Vegas, USA Retrieved from the Internet : URL:www.3gpp.org.

Notice of Grounds for Rejection for Korean Application No. 2008-7012768, dated Oct. 29, 2010 (English Translation).

OA dated Dec. 29, 2008 for European Application Serial No. 06826840.8, 3 pages.

OA dated Feb. 20, 2009 for European Application Serial No. 06 836 598.0-2414, 10 pages.

OA dated Jul. 1, 2009 for Korean Application Serial No. 2008-7012465, 9 pages.

OA mailed Feb. 26, 2010 for Korean Patent Application Serial No. 2008-7012649, 3 pages.

OA mailed Aug. 31, 2010 for Korean Patent Application Serial No. 2008-7012649, 3 pages.

Office Action dated Jan. 25, 2011 for European Patent Application No. 06826876.2, 3 pages.

Office Action dated Oct. 9, 2010 for Chinese Patent Application No. 200680049399.6, 11 pages.

Office Action dated Mar. 1, 2011 for Japanese Patent Application No. 2008-537995, 4 pages.

Office Action for Chinese Application No. 200680049394.3 dated Jan. 10, 2011, 8 pages.

Office Action for Chinese Application Serial No. 200680049342.6 dated Jun. 11, 2010, 5 pages.

Office Action for Chinese Patent Application No. 200680049746.5 dated Jan. 26, 2011.

Office Action for Korean Application No. 2008-7012761 dated Mar. 19, 2010, 4 pages.

Office Action for Korean Application No. 2008-7012761 dated Nov. 25, 2011, 4 pages.

"Office Action for Korean Application Serial No. 2008-7012756 dated Jul. 29, 2010, 2 pages.".

Office Action for Korean Patent Application No. 2008-7012556 dated Apr. 30, 2010, 2 pages.

Office Action for Korean Patent Application Serial No. 2008-7012768 dated Apr. 28, 2010, 4 pages.

Office Action mailed Mar. 15, 2010 for Korean Patent Application No. 20087012580, 3 pages.

Office Action mailed Jul. 29, 2010 for Korean Patent Application No. 20087012580, 3 pages.

Office Action mailed Jan. 25, 2010 for Korean Patent Application No. 2008-7012767 3 pages.

Office Action mailed Jan. 26, 2010 for Korean Patent Application No. 2008-7012457, 3 pages.

Office Action mailed Jan. 26, 2010 for Korean Patent Application No. 2008-7012467, 5 pages.

Office Action mailed Jan. 26, 2010 for Korean Patent Application No. 2008-7012579, 4 pages.

Office Action mailed Jan. 27, 2011 for Japanese Patent Application No. 2008-538077, 3 pages.

Office Action mailed Jan. 29, 2010 for Korean Patent Application Serial No. 2008-7012464, 5 pages.

Office Action mailed Oct. 30, 2009 for Korean Patent Application No. 2008-7012766, 3 pages.

Office Action mailed Nov. 16, 2009 for Korean Patent Application No. 2008-7012767 3 pages.

Office Action mailed Dec. 14, 2010 for Chinese Patent Application No. 200680049322.9, 5 pages.

Office Action mailed Dec. 18, 2009 for European Patent Application Serial No. 06836601.2, 3 pages.

Office Action mailed Feb. 23, 2010 for Korean Patent Application No. 2008-7012570, 4 pages.

Office Action mailed Feb. 26, 2010 for Korean Patent Application No. 2008-7012460, 4 pages.

Office Action mailed Feb. 26, 2010 for Korean Patent Application No. 2008-7012461, 3 pages.

Office Action mailed Feb. 26, 2010 for Korean Patent Application No. 2008-7012480, 3 pages.

Office Action mailed Feb. 26, 2010 for Korean Patent Application No. 2008-7012604, 4 Pages.

Office Action mailed Mar. 10, 2010 for Korean Patent Application No. 2008-7012468, 3 pages.

Office Action mailed Mar. 23, 2010 for Korean Patent Application No. 2008-7012481, 3 pages.

Office Action mailed Apr. 23, 2010 for Korean Patent Application No. 2008-7012767 2 pages.

Office Action mailed Jun. 29, 2010 for Korean Patent Application No. 2008-7012461, 3 pages.

Office Action mailed Aug. 13, 2009 for Korean Patent Application Serial No. 2008-7012757, 3 pages.

Office Action mailed Aug. 2, 2010 for European Patent Application No. 06827064, 8 pages.

Office Action mailed Aug. 27, 2008 for European Patent Application Serial No. 06836601.2, 7 pages.

Office Action mailed Sep. 27, 2010 for Chinese Patent Application No. 200680049453.7, 13 pages.

Office Action mailed Sep. 30, 2010 for Korean Patent Application No. 2008-7012481, 4 pages.

Office Action mailed Mar. 9, 2010 for U.S. Appl. No. 12/091,482, 29 pages.

Office Action mailed May 6, 2011 for Chinese Patent Application No. 200680049640.5, 5 pages.

Office Action mailed Sep. 13, 2010 for U.S. Appl. No. 12/091,482, 20 pages.

Preliminary Notice of Reasons for Rejection for Japanese Application No. 2008-537984, dated Mar. 15 , 2011 (English Translation).

QUALCOMM Europe, Description and link simulations of MIMO schemes for OFDMA based E-UTRA downlink evaluation, 3GPP TSG-RAN WGI #42 R1-050903, Sep. 2, 2005, URL, http://www.3gpp.org/ftp/tsg_ran/WGI_RLI/TSGRI-42/Docs/R1-050903.zip.

Qualcomm Europe, Qualitative Evaluation of MIMO schemes for OFDM-based E-UTRA downlink, 3GPP TSG-RAN WG1 #42bis R1-051267, Oct. 14, 2005, URL, http:/www.3gpp.org/ftp/tsg_ran/WG1_RL1/TSGR1_42bis/Docs/R1-051267.zip, 5 pages.

QUALCOMM: "UHDR-One Connection Layer: Registration, Paging and Disc. Features" 3GPP2, [Online] Aug. 25, 2006, pp. 1-17, XP002429007.

Rosenberg, J., et al., "SIP: Session Initiation Protocol ; RFC 3261" Request for Comments: 3261, Jun. 2002, p. 1, 176,177,184-193, XP002423186.

Sandip Sarkar: "Qualcomm Proposal for 3GPP2 Physical Layer; Version 1.0; pp. 1-10, 72-74; C30-20060522-035 QC-Proposal-v1.0" QUALCOMM; 3GPP2, [Online] May 22, 2006, XP002426839.

Soong et al., "Forward High-Speed Wireless Packet Data Service in 15-2000 1xEV-DV" IEEE Communications Magazine, 41 (8), pp. 170-177, Aug. 2003.

Taiwanese Search report—095121733—TIPO—Nov. 2, 2010.

Telecommunications Industry Association. "Upper Layer (Layer3) Signaling Standard for cdma2000 Spread Spectrum Systems," TIA/EIA/IS-2000.5-A-1, Nov. 2000, published online at [http://www.tiaonline.org/standards/technology/cdma2000/documents/TIA-EIA-IS-2000-5-A-1.pdf] 11 pages.

Telecommunications Industry Association: Upper Layer (Layer 3) Signaling Standard for CDMA2000 Spread Spectrum Systems, Release C, (186 pages) chapters: 2.6.4.3,2.6.6.2.8,2.73..26..63,. TIA/EIA Interim Standard; TIA/EIA/IS-2000. 5-C, May 2002, XP002423446.

TIA-EIA-IS-856, TIA/EIA Interim Standard, "cdma2000 High Rate Packet Data Air Interface Specification," Telecommunications Industry Association, Nov. 2000.

Translation of Office Action for Japanese Patent Application No. 2008-538080 dated Mar. 29, 2011.

(56) References Cited

OTHER PUBLICATIONS

Turner, S. et al., "cdma 2000 Hybrid Access Terminal Operation", Announcement Qualcomm CDMA Technologies, San Diego, CA, USA, Apr. 9, 2001,pp. 1-25, XP002422171.

U.S. Appl. No. 60/731,037, filed Oct. 27, 2005, entitled "Methods and Apparatus for Providing Mobile Broadband Wireless Higher MAC", 148 pages.

Wonil Roh Et. Al. : "An Efficient CQICH Signaling for MIMO OFDMA" IEEE 802.16 Broadband Wireless Access Working Group, [Online] Aug. 31, 2004, XP002428096 Retrieved from the Internet : URL : www. ieee802. org/16/>.

Taiwan Search Report—TW095139658—TIPO—Feb. 17, 2012 (060080TW).

Qualcomm Europe: "MIMO proposal for MIMO-WCDMA evaluation", 3GPP TSG-RAN WG1#42, R1-050912, Aug. 29-Sep. 2, 2005, pp. 21.

Xiao Y, "Orthogonal Frequency Division Multiplexing Modulation and Inter-Carrier Interference Cancellation", Thesis submitted to the Graduate Faculty of the Louisiana State University and Agricultural and Mechanical College in partial fulfillment of the requirements for the degree of Master of Science in Electrical Engineering, May 2003, pp. 1-53.

IEEE Standard 802.16, IEEE Standard for Local and Metropolitan Area Networks, Part 16: Air Interface for Fixed Broadband Wireless Access Systems, pp. 1-895, Oct. 1, 2004.

\* cited by examiner

QUICK PAGING CHANNEL WITH REDUCED PROBABILITY OF MISSED PAGE

CLAIM OF PRIORITY UNDER 35 U.S.C. §119

This application claims the benefit of U.S. Provisional Application No. 60/691,469, filed Jun. 16, 2005, entitled "QUICK PAGING CHANNEL WITH REDUCED PROBABILITY OF MISSED PAGES," and U.S. Provisional Application No. 60/731,037, filed Oct. 27, 2005, entitled "METHODS AND APPARATUS FOR PROVIDING MOBILE BROADBAND WIRELESS HIGHER MAC," both are assigned to the assignee hereof and hereby expressly incorporated by reference herein.

BACKGROUND

In a random access wireless communication system, a communication link between an access terminal and an access point is not continuous. An access terminal can register with an access point and can remain in an idle state. The access terminal can transition from the idle state to an active state to initiate an active communication link. In the active state, the access terminal is able to receive information from the access point as well as transmit information to the access point.

For the majority of the time, the access terminal remains in the idle state, awaiting the transition into the active state. The access terminal is typically a mobile device that operates from batteries stored within the device. The access terminals can conserve energy and extend the battery operated run time by transitioning to a low power state, often referred to as a sleep state. However, in many instances, the access terminal cannot immediately transition from the sleep state to the active state.

The access terminal typically does not have the ability to monitor information transmitted by the access points when it is in the sleep state. Therefore, the access terminals typically periodically transition to an idle state to monitor for messages from the access points.

Some wireless communication systems incorporate quick paging channels that are used by the access points to indicate the presence of a paging message to an access terminal. The paging message can direct the particular access terminal to transition to the active state to support active information exchange.

The wireless communication system can assign a particular bit in a particular message as the quick paging bit for a particular access terminal or group of access terminals. The access terminals can then awaken from a sleep state for a duration that is sufficient to receive the quick paging bit. If the access terminal detects an active quick paging bit, the access terminal becomes aware of a subsequent paging message and can remain in or transition to the idle state to monitor for the paging message. Conversely, if the access terminal fails to detect its assigned quick paging bit, it assumes that there are no imminent paging messages directed to it. In this manner, the access terminals can minimize the time that they need to be in an idle mode, thereby maximizing the time that can be dedicated to a lower power sleep state.

For example, both CDMA2000 and WCDMA wireless communication systems have a quick paging channel that allows a mobile station to periodically monitor an assigned quick paging bit to detect a presence of a page. When a page is sent to the mobile station, the base station sets the corresponding bit to '1'. If the bit is set, the mobile station, which represents the access terminal, listens to the full page. However, if the access terminal improperly detects the bit to be '0', or determines an erasure indicating the inability to discern the state of the received bit, then a missed page occurs. Therefore, there is a need to reduce the probability of a missed page. However, there remains the need to maintain or increase the battery powered operational time for mobile devices.

BRIEF SUMMARY

Systems and methods of generating quick paging messages having nearly unique identifiers and variable capacity are described. The system generates a quick paging message identifying an access terminal to indicate the presence of a scheduled paging message for that access terminal. The system generates a quick paging notification for each access terminal having a scheduled paging message and generates a compressed nearly unique identifier of each access terminal that is notified in the quick paging message. The compression technique can vary based on the number of bits allocated to the quick paging message as well as the number of access terminals notified in one quick paging message.

Aspects of the disclosure include a method of generating a quick page message in a wireless communication system. The method includes generating a compressed identifier value for at least one access terminal notified in the quick page message, assembling the quick paging message including the compressed identifier, and generating a wireless signal including at least a portion of the quick page message.

Aspects of the disclosure include a method of generating a quick page message in a wireless communication system. The method includes determining the identity of access terminals scheduled to receive at least one paging message, determining the number of access terminals scheduled to receive at least one paging message, determining a compressed identifier value for each of at least a portion of the access terminals scheduled to receive at least one paging message, and assembling the quick page message based at least in part on the number of access terminals scheduled to receive at least one paging message and the compressed identifier value.

Aspects of the disclosure include a method of processing a quick page message in a wireless communication system. The method includes receiving a wireless signal having the quick page message, recovering the quick page message from the wireless signal, determining a number of compressed identifier values in the quick page message, and comparing each compressed identifier value from the quick page message with a predetermined compressed identifier value.

Aspects of the disclosure include an apparatus for generating a quick page message, that includes a paging message counter configured to determine a number of unique access terminals scheduled to receive a paging message, a compressed identifier generator coupled to the paging message counter and configured to generate a compressed identifier for each of at least a subset of the unique access terminals, and a message assembler coupled to the compressed identifier generator and configured to set a count field in the quick page message based on the number of unique access terminals, and further configured to concatenate the compressed identifiers corresponding to each of the subset of unique access terminals.

Aspects of the disclosure include an apparatus for processing a quick page message that includes a receiver configured to receive a wireless signal having the quick page message, a receive processor coupled to the receiver and configured to extract the quick page message from the wireless signal, a compressed value module configured to generate a predetermined compressed identifier, and a comparator configured to extract at least one compressed identifier from the quick page message and compare it to the predetermined compressed identifier to determine whether the system is notified of a scheduled paging message.

Aspects of the disclosure include an apparatus for generating a quick page message, that includes means for generating a compressed identifier value for at least one access terminal notified in the quick page message, means for assembling the quick paging message including the compressed identifier, and means for transmitting a wireless signal including at least a portion of the quick page message.

Aspects of the disclosure include an apparatus for processing a quick page message that includes means for receiving a wireless signal having the quick page message, means for recovering the quick page message from the wireless signal, means for determining a number of compressed identifier values in the quick page message, and means for comparing each compressed identifier value from the quick page message with a predetermined compressed identifier value.

Aspects of the disclosure include a processor readable media including instructions that may be utilized by one or more processors. The instructions include instructions for generating a compressed identifier value for at least one access terminal notified in the quick page message, instructions for assembling the quick paging message including the compressed identifier, and instructions for generating a signal including at least a portion of the quick page message, and coupling the signal to a wireless transmitter.

Aspects of the disclosure include a processor readable media including instructions that may be utilized by one or more processors. The instructions include instructions for receiving a signal having the quick page message, instructions for recovering the quick page message from the signal, instructions for determining a number of compressed identifier values in the quick page message, and instructions for comparing each compressed identifier value from the quick page message with a predetermined compressed identifier value.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION

A wireless communication system can reduce the probability of missed pages while decreasing the power consumption of an average access terminal through strategic planning and implementation of the number of bits and arrangement of the information supplied in the quick paging message. The wireless communication system can increase the number of bits in the quick paging message identifying each access terminal that is notified of a paging message.

The wireless communication system can identify the access terminal via a unique access terminal identifier, or a compressed version of the unique identifier. If the wireless communication system utilizes the complete unique identifier in the quick paging channel, there is a reduced probability that an access terminal other than the desired access terminals will remain active to monitor the paging message. However, the length of the quick paging message needed to contain all of the unique identifiers notified during a particular quick paging message may be relatively long, and all of the access terminals monitoring the quick paging message need to remain active for the duration needed to monitor the contents of the quick paging message. In such a situation, the average power consumption the access terminals save by not monitoring for paging messages directed to other access terminals may be consumed monitoring lengthy quick paging messages.

In one embodiment, the wireless communication system generates a compressed version of the unique access terminal identifiers for inclusion in the quick paging message. The compressed identifiers corresponding to the access terminals scheduled for paging messages are included in the quick paging message. The quick paging message can include a field that identifies the number of quick page messages.

The wireless communication system can generate a quick page message with a constant compressed identifier length and a quick page message length that varies according to the number of quick page messages. Alternatively, the wireless communication system can generate a quick page message that has a variable compressed identifier length and a constant quick page message length. In both embodiments, the wireless communication system may have a maximum number of quick page messages that can populate the quick page message. The wireless communication system can implement a field that identifies additional pages to inform the access terminals monitoring the quick page message that there were more quick pages than could be populated in the quick page message.

Figure 1:
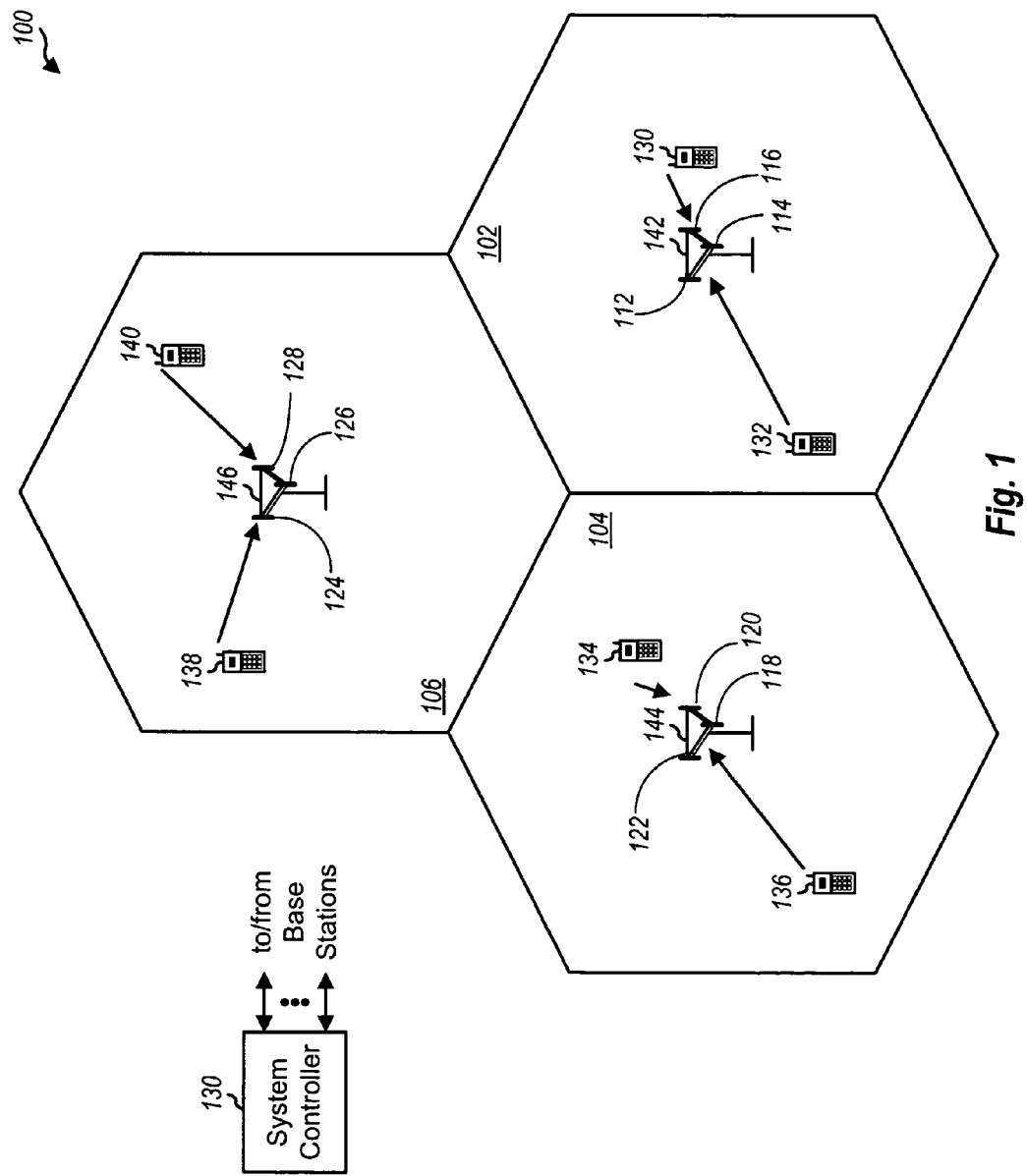
FIG. 1 is a simplified functional block diagram of an embodiment of a multiple access wireless communication system.

FIG. 1 is a simplified functional block diagram of an embodiment of a multiple access wireless communication system 100. A multiple access wireless communication system 100 includes multiple cells, e.g. cells 102, 104, and 106. In the embodiment of FIG. 1, each cell 102, 104, and 106 may include an access point 150, as shown in cell 102, for example, that includes multiple sectors.

FIG. 1 shows an exemplary system controller 10 in the system 100 that may, in addition to other functions, communicate with Base Stations. For example, the system controller 10 may send communications to Base Stations and/or it may retrieve communications from Base Stations, as shown in FIG. 1.

The multiple sectors are formed by groups of antennas each responsible for communication with access terminals in a portion of the cell. In cell 102, antenna groups 112, 114, and 116 each correspond to a different sector. For example, cell 102 is divided into three sectors, 102a-102c. A first antenna 112 serves a first sector 102a, a second antenna 114 serves a second sector 102b, and a third antenna 116 serves a third sector 102c. In cell 104, antenna groups 118, 120, and 122 each correspond to a different sector. In cell 106, antenna groups 124, 126, and 128 each correspond to a different sector.

Each cell is configured to support or otherwise serve several access terminals which are in communication with one or more sectors of the corresponding access point. For example, access terminals 130 and 132 are in communication with access point 142, access terminals 134 and 136 are in communication with access point 144, and access terminals 138 and 140 are in communication with access point 146. Although each of the access points 142, 144, and 146 is shown to be in communication with two access terminals, each access point 142, 144, and 146 is not limited to communicating with two access terminals and may support any number of access terminals up to some limit that may be a physical limit, or a limit imposed by a communications standard.

As used herein, an access point may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a user terminal, a wireless communication device, a terminal, a mobile terminal, a mobile station or some other terminology.

Each access point, for example 142, generates a quick paging message based on the identities of access terminals within the coverage area that are scheduled to receive paging messages. The access point 142 can generate a compressed identifier for each scheduled access terminal. For example, the access point 142 can generate a hash of the access terminal identifier and populate the quick page message with the hash value.

An access point, for example 142, may broadcast a frame or block having the quick paging message. Each of the access terminals, 130 and 132 within the coverage area of the access point 142 can receive the quick paging message and process it to determine if an associated quick paging indicator is asserted, indicating the presence of a paging message directed to the access terminal.

Figure 2:
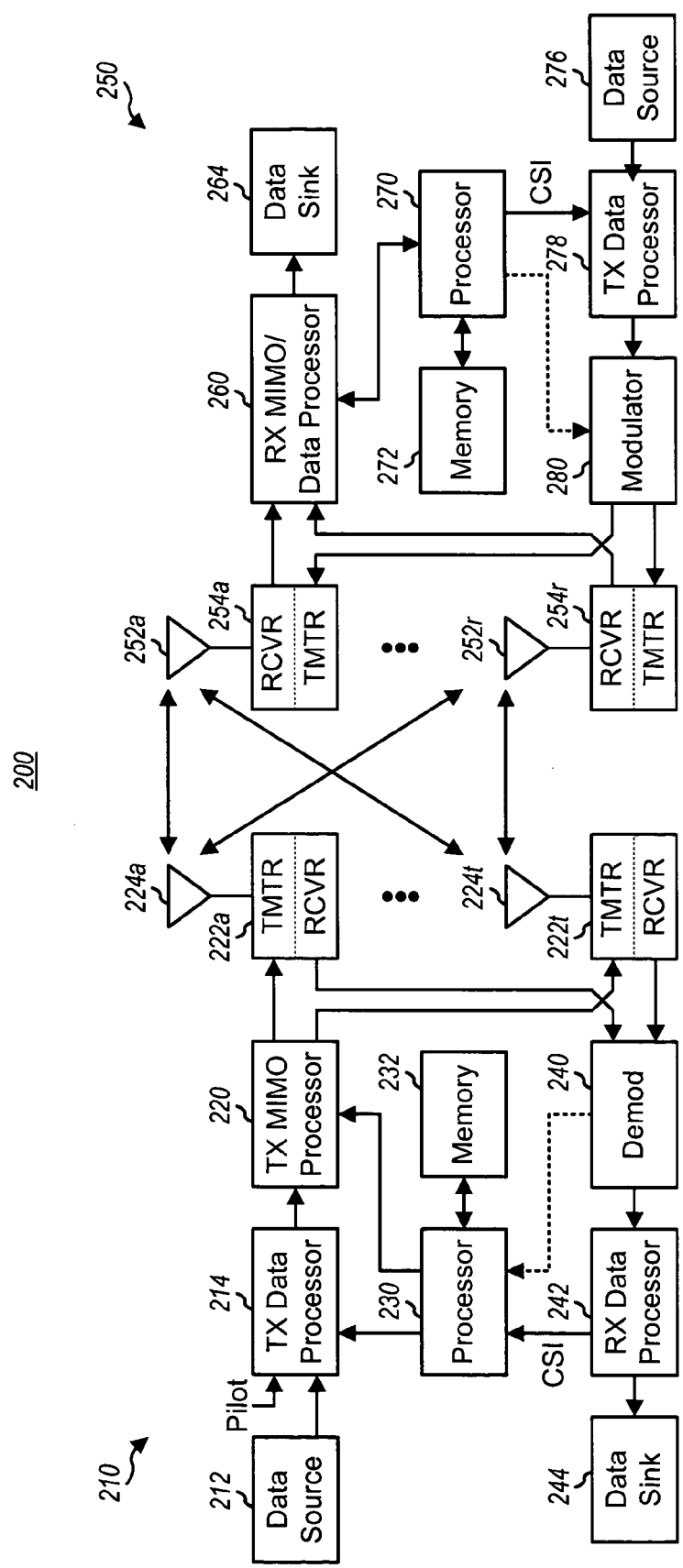
FIG. 2 is a simplified functional block diagram of an embodiment of a transmitter and receiver in a multiple access wireless communication system.

The above embodiments can be implemented utilizing transmit (TX) processor 220 or 260, processor 230 or 270, and memory 232 or 272, as shown in FIG. 2. The processes may be performed on any processor, controller, or other processing device and may be stored as computer readable instructions in a computer readable medium as source code, object code, or otherwise.

FIG. 2 is a simplified functional block diagram of an embodiment of a transmitter and receiver in a multiple access wireless communication system 200. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies beamforming weights to the symbols of the data streams based upon the user to which the symbols are being transmitted and the antenna from which the symbol is being transmitted. In some embodiments, the beamforming weights may be generated based upon channel response information that is indicative of the condition of the transmission paths between the access point and the access terminal. The channel response information may be generated utilizing CQI information or channel estimates provided by the user. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions provided by processor 230. In some embodiments, the number of parallel spatial streams may be varied according to the rank information that is transmitted from the user.

The modulation symbols for all data streams are then provided to a TX MIMO processor 220, which may further process the modulation symbols (for example, for OFDM). TX MIMO processor 220 then provides $N_T$ symbol streams to $N_T$ transmitters (TMTR) 222a through 222t. In certain embodiments, TX MIMO processor 220 applies beamforming weights to the symbols of the data streams based upon the user to which the symbols are being transmitted and the antenna from which the symbol is being transmitted from that users channel response information.

Each transmitter 222a through 222t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide the rank number of "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. Data may be further output by the RX data processor 260 to a data sink 264.

At transmitter system 210, the modulated signals from receiver system 250 are received by antennas 224, conditioned by receivers 222, demodulated by a demodulator 240, and processed by a RX data processor 242 to recover the CQI reported by the receiver system. Data may be further output by the RX data processor 242 to a data sink 244. The reported CQI is then provided to processor 230 and used to (1) determine the data rates and coding and modulation schemes to be used for the data streams and (2) generate various controls for TX data processor 214 and TX MIMO processor 220.

In the multiple access wireless communication system 200 of FIG. 2, the TX data processor 214, in combination with the processor 230 and memory 232, can operate to determine the number of scheduled paging messages corresponding to the receiver systems 250 in the coverage area. The TX data processor 214 can be configured to generate a hash value based on a unique access terminal identifier for each scheduled receiver system 250. The TX data processor 214 can generate a quick paging message that includes the number of receiver systems 250 identified in the quick paging message, and the hash values corresponding to each scheduled receiver system 250.

Each receiver system 250 can operate to receive the quick paging message and recover the corresponding hash values. The RX processor 260, in combination with the processor 270 and memory 272, can determine whether any hash value in the quick paging message identifies the receiver system 250. The receiver system 250 can monitor for paging messages if it is identified by the hash value. Alternatively, the receiver system 250 can transition to a sleep state and can wait for the next scheduled quick page message if its hash value is not included in the quick page message. In addition, the receiver system 250 may include a Data Source 276, TX Data Processor 278 and Modulator 280 for further receipt and processing of data, as shown in FIG. 2.

Figure 3:
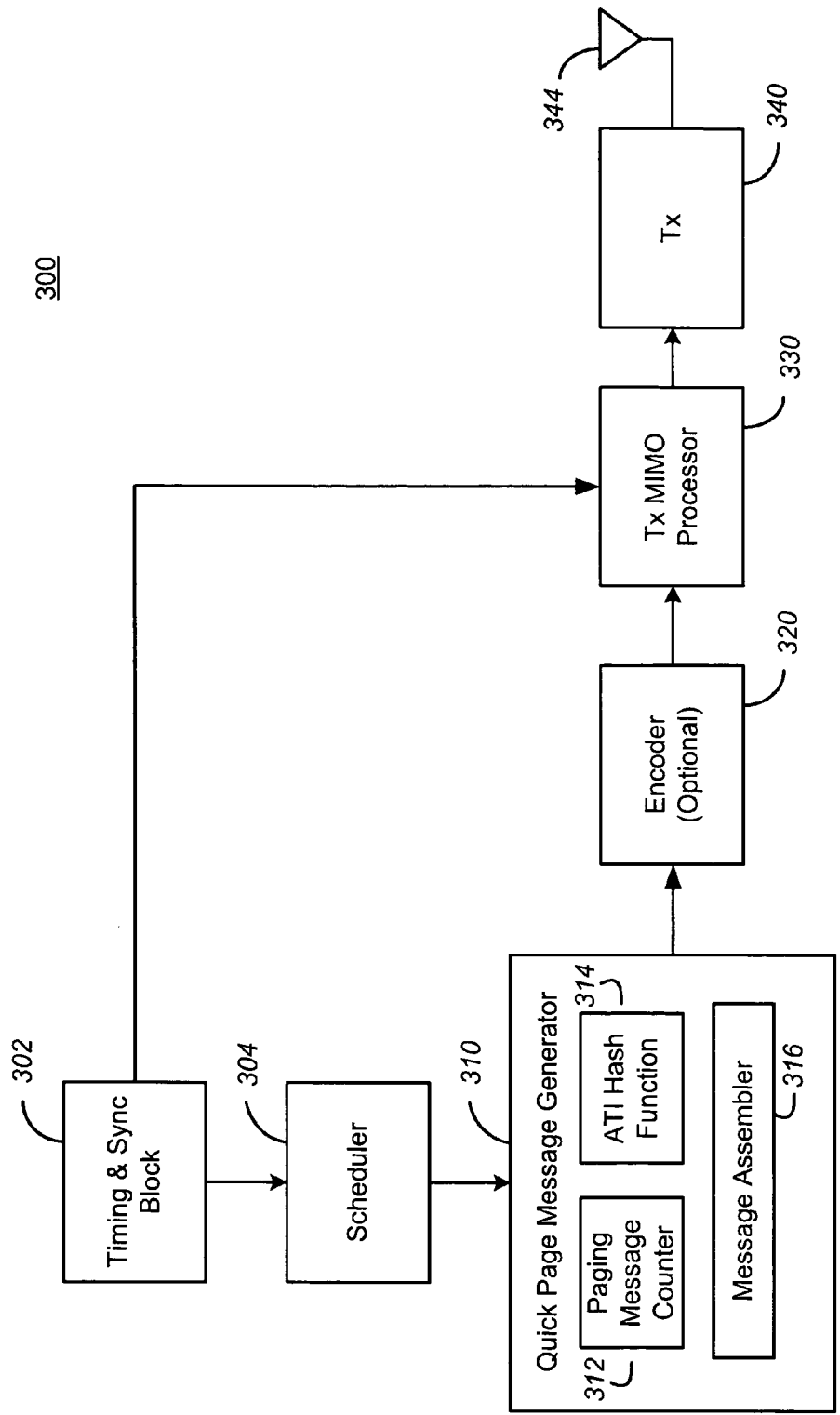
FIG. 3 is a simplified functional block diagram of an embodiment of a system for generating and transmitting a quick page message.

FIG. 3 is a simplified functional block diagram of an embodiment of a system 300 for generating and transmitting a page message. The system 300 can be, for example, a portion of a transmitter system of FIG. 2, or a portion of an access point shown in FIG. 1.

The simplified functional block diagram of FIG. 3 illustrates only a portion of the system associated with generating an transmitting the quick paging message. The simplified functional block diagram does not show related blocks such as those associated with generating or mapping the paging messages that are associated with access terminals identified in the quick paging message and does not show scheduling, processing and transmitting of data, information, or other traffic that can be communicated to an access terminal.

The system 300 embodiment of FIG. 3 includes a timing and synchronization module 302 coupled to a scheduler 304. The scheduler 304 is coupled to a quick page message generator 310, and initiates generation of the quick page message. The quick page message generator 310 optionally couples the quick page message to an encoder 320. The encoder 320 operates to encode the bits of the quick page message to produce an encoded quick page message. The encoded output is coupled to a TX MIMO processor 330. The TX MIMO processor 330 couples the signal to a transmitter stage 340 that transmits the signal using an antenna 344.

The timing and synchronization module 302 tracks the timing of the bits, frames, blocks, or packets received and generated by the system 300. In one embodiment, the timing and synchronization module 302 maintains bit synchronization, such that the bits generated by the system 300 have substantially the same period. The timing and synchronization module 302 can also synchronize and track slot and frame timing, where each frame includes a predetermined number of bits. In an OFDM system, a slot may include one or more OFDM symbols, and a frame can include one or more slots.

A superframe can include a predetermined number of frames. Additionally, specific frames within the superframe can be dedicated to particular information. For example, each superframe can include a preamble of a predetermined length, such as six frames or six OFDM symbols.

The superframe preamble can be used to populate a broadcast channel that is transmitted to all access terminals within a coverage area of an access point. One portion of the superframe preamble can be allocated to a quick paging channel (QPCH) used to convey the quick page message. For example, the Quick page message can be one frame or OFDM symbol within the superframe preamble. The length of the superframe preamble can be static or can be varied based on the size of the information block allocated to the quick page message.

In one embodiment, the number of bits allocated to the quick page message is static. In another embodiment, the number of bits allocated to the quick page message is dynamic and determined based at least in part on the number of access terminals that need to be notified in the quick page message. Where the number of bits allocated to the quick page message is dynamic, the system 300 can allocate a number of bits by selecting on of a predetermined set of packet lengths. Alternatively, the system 300 can be configured to allocate any number of bits to the quick page message within a predetermined range or in increments of a single bit.

The system 300 can be configured to send the size of the quick page message within a field of the message or some other message. In an embodiment, the system 300 does not send the size of the quick page message and relies on the receiver to determine the size of the packet.

The timing and synchronization module 302 is coupled to a scheduler 304. The scheduler 304 tracks the communication links and information that is to be transmitted by the system 300, and schedules the information, based in part on the system timing. In one embodiment, the scheduler 304 determines that the wireless communication system is attempting to set up an active communication session with an access terminal that is presently in an idle state.

The quick page message generator 310 determines from the scheduler 304 which of the access terminals within the coverage area of the system 300 are scheduled to receive a page message. The quick page message generator 310 includes a paging message counter 312, an Access Terminal Identification Hash generator 314, and a message assembler 316.

The paging message counter 312 determines, based on the scheduler 304, the number of access terminal paging messages that are scheduled to be transmitted during the present superframe or other quick page period. The paging message counter 312 determines the number of distinct access terminals that are scheduled to receive paging messages. This number may be used in the quick page message generator 310 for a variety of reasons.

In an embodiment in which the length of the quick page message is variable, the number of access terminals notified in the quick page messages can be indicative of the length of the quick page message and the number can be included within a field of the quick page message. In an embodiment in which the length of the quick page message is static, the number of bits that are used to identify the access terminals in the quick page message can vary based on the number of access terminals notified in the quick page message. The number of access terminals notified in the quick page message can be included in a field of the quick page message to inform the access terminals of the manner in which the access terminals are identified.

The Access Terminal Identifier Hash (ATIH) generator 314 is configured to generate a compressed version of an access terminal identifier. Although the following embodiments describe the compression function as a hash function, the ATIH generator 314 can be virtually any type of compressed identifier generator and can compress the ATI values or some other access terminal identifier using any mapping or algorithm that results in fewer bits.

Each access terminal has a unique identifier referred to as the access terminal identifier (ATI). If the ATI of the access terminal is carried in the page message, the access terminal knows that the network has data to send.

The ATIH generator 314 is configured to determine an N bit hash of an ATI, referred to as the ATIH (e.g. ATIH=HashFunction(ATI)). In some embodiments, the ATI may be 48 to 128 bits long, while N may be 8 bits. The mapping of the ATI to the ATIH may not be unique, because the ATIH generator 314 may compress the ATI to a representation having fewer bits. The amount of compression performed on the ATI, also referred to as the compression ratio, affects the number of potential access terminal ATI values that will map to the same ATIH.

The ATIH generator 314 can reserve one or more ATIH values such that no ATI values map to the reserved ATIH values. For example, the ATIH generator 314 may reserve the ATIH value of zero in order to indicate the condition in which no access terminals are to be notified. The ATIH generator 314 can be assured that the no access terminal ATI values will inadvertently map to the zero value by reserving the zero ATIH value.

If the ATIH of the access terminal is carried in the quick page message, the access terminal determines that the network may have a page to send, and the access terminal monitors the page message for a page directed to it. In contrast, if the ATIH is not carried in the quick page message, the access terminal may conserve power by not reading the page message and may instead transition to a low power sleep state.

The non-unique mapping of the ATI to ATIH values can cause quick page collisions, where two different access terminals have the same ATIH. In such a situation, the non-unique ATIH included in a quick page message causes more than one access terminal to monitor the page message although there is only a page message for one of the access terminals having the ATIH value. For example, if the ATIH generator 314 generates the same ATIH for two distinct access terminals, AT1 and AT2, and this ATIH is carried in the quick page message, both AT1 and AT2 will monitor the page message. However, the actual page message may contain only a page for AT1 and not for AT2.

In an embodiment in which the length of the quick page message is variable, the ATIH generator 314 generates an ATIH value according to a predetermined algorithm. The ATIH generator 314 generates the ATIH corresponding to the ATI for each access terminal to be notified in the quick page message. There may be a practical limit to the length of the quick page message. Therefore, the system 300 may define a maximum number of access terminals that can be expressly identified in the quick page message.

In an embodiment in which the length of the quick page message is static, the ATIH generator 314 generates an ATIH value based in part on the number of access terminals to be notified in the quick page message. The ATIH generator 314 performs a variable compression of the ATI values, and the rate of compression varies depending at least on the number of access terminals notified in the quick page message. When there are fewer access terminals notified in a quick page message, it may be advantageous for the ATIH generator to use a lower compression ratio in order to decrease the probability of a quick page collision. In some instances, the ATIH generator 314 need not even compress the ATI value, and the ATI and ATIH can be the same value. As the number of access terminals notified in the quick page message increases, the ATIH generator 314 can increase the compression ratio such that the total number of bits in the quick page message used to identify access terminals is approximately the same.

For example, the system 300 may allocate a fixed number of bits, $N_{QP\_BLK}$ to the quick page message. Furthermore, a particular field in the quick page message dedicated to ATIH values can have a maximum length, for example, 35 bits. If the paging message counter 312 determines that only one access terminal needs to be notified in the quick page message, the ATIH generator 314 can generate an ATIH that has less than or equal to 35 bits. If the paging message counter 312 determines that two access terminals are to be notified, the ATIH can be configured to generate ATIH values that have no greater than 17 bits each. Similarly, to notify three access terminals in the quick page message, the ATIH generator 314 generates ATIH values having no greater than 11 bits each. There may be a practical limit to the compression ratio applied by the ATIH generator 314. Therefore, the system 300 may set a maximum number of access terminals that can be expressly identified in the quick page message.

As noted above, regardless of whether the quick page message has a static or a dynamic length, the system 300 may define a maximum number of access terminals that can be expressly identified in the quick page message. That is, the quick page message may be sent over a Quick Paging channel that has a limited capacity, e.g. Q bits. There may be some instances in which the paging message counter 312 determines that the number of access terminals to be notified is greater than the maximum number that can be expressly notified. In such a situation, the quick page message can include a field that identifies that there are more quick page notifications than could be contained in the quick page message. Such a field may be referred to as a 'more' or 'additional identifier' field.

The 'more' field can be one or more bits that, when asserted, indicate that there are more quick pages than could be represented in the quick page message. In such a situation, access some terminals that are not expressly notified may choose to monitor the paging channel for the paging message. In order to minimize the number of non-identified access terminals that need to monitor the paging channel, the quick page message can be populated with the lowest value ATIH values. Then, if the 'more' field is asserted, only those access terminals having an ATIH value greater than the largest ATIH value included in the quick page message need monitor the paging channel for the paging message.

The ATIH generator 314 can be configured to generate less than or equal to the maximum number of ATIH values. In one embodiment, the ATIH generator 314 generates the ATIH values for the access terminals having the lowest ATIH values. In another embodiment, the ATIH generator 314 generates ATIH values for all access terminals scheduled for paging messages, and another module determines which of the ATIH values to populate the quick page message.

The message assembler 316 operates to assemble the quick page message based on the number determined by the paging message counter 312. The message assembler 316 populates a field identifying the number of access terminals. If the number of access terminals is greater than the predetermined maximum number, the message assembler 316 uses the value corresponding to the maximum number.

The message assembler 316 also populates an ATIH field in the quick page message identifying the access terminals. If the number of access terminals to be notified in the quick page message is less than or equal to the maximum number, including zero, the message assembler 316 concatenates the ATIH values corresponding to the access terminals. The message assembler 316 clears the 'more' field, which can be a single bit.

If the number of access terminals to be notified in the quick page message is greater than the maximum number, the message assembler 316 concatenates the maximum number of ATIH values selected from the lowest ATIH values. The message assembler 316 can sort the ATIH values and populate the quick page message in order of increasing ATIH values. The message assembler 316 asserts the 'more' field.

The message assembler 316 can zero pad or otherwise populate the quick page message in order to obtain a desired message length. Where the ATIH generator 314 generates differing ATIH values depending on the number of access terminals notified in the quick page message, the message assembler 316 can zero pad the quick page message to provide a consistent quick page message length.

The encoder 320 is optional and may be omitted from some systems 300. The encoder 320 operates to encode the quick page message. The encoder 320 can implement virtually any type of encoding, and can implement, for example, systematic encoding, block coding, convolutional encoding, turbo encoding, and the like, or some combination thereof. The output of the encoder 320 is an encoded quick page message.

In one embodiment, the encoder 320 implements a systematic code, such that the redundant bits are appended to the end of the unmodified quick page message. A systematic code can generate, for example, a Cyclic Redundancy Code (CRC), a syndrome, a parity bit, or some other code bits that provide a level of redundancy.

The encoder 320 couples the encoded quick page message to the TX MIMO Processor 330. In one embodiment, the TX MIMO Processor 330 processes the encoded quick page message and produces an OFDM symbol having the complete encoded quick page message. The TX MIMO Processor 330 can generate the OFDM symbol by allocating the quick page message information across all of the OFDM subcarriers, or across a predetermined subset of all of the subcarriers. For example, the TX MIMO Processor 330 can modulate the quick page message onto all subcarriers allocated to carrying information. In such an embodiment, the symbol having the quick page message is time division multiplexed with other channels in the OFDM system.

In some embodiments, the TX MIMO Processor 330 may be able to modulate the Quick page message onto the subcarriers using any one of a predetermined set of modulation types. In an embodiment, the TX MIMO Processor 330 uses QPSK modulation for all the modulation symbols of the QPCH. In other embodiments, the TX MIMO Processor 330 may use some other type of modulation, such as BPSK.

In another embodiment, the Quick page message information is allocated to a logical channel that is mapped to fewer than all of the subcarriers in the OFDM system. In such an embodiment, the logical channel to physical subcarrier mapping can be static or can be dynamic.

If the multiple access wireless communication system employs frequency hopping (FH), the quick paging channel (QPCH) can be assigned as a logical channel, sometimes referred to as a hop port, and the logical channel can be mapped to physical channels according to a predetermined frequency hopping algorithm. Thus, in a frequency hopping OFDMA system, the physical subcarrier frequencies assigned to the logical channels change over time. For example, the frequency hopping algorithm can periodically update the logical channel to physical subcarrier mapping, for example, each OFDM symbol, each slot, or following some other predetermined number of OFDM symbols.

The TX MIMO Processor 330 couples the OFDM symbol to the transmitter stage 340. The transmitter stage 340 transmits the symbol including the quick page message using the antenna 344.

In the embodiments described above, the transmitter broadcasts the quick page message in an OFDM symbol occurring during a preamble portion of a superframe. The transmitter broadcasts the OFDM symbol to all of the access terminals in the coverage area.

By transmitting the quick page message in a preamble, a large number of access terminals may be addressed simultaneously. The transmission of the quick page message in a single OFDM symbol allows several access terminals to wakeup concurrently to monitor the quick page message for their respective ATIH values.

Figure 4:
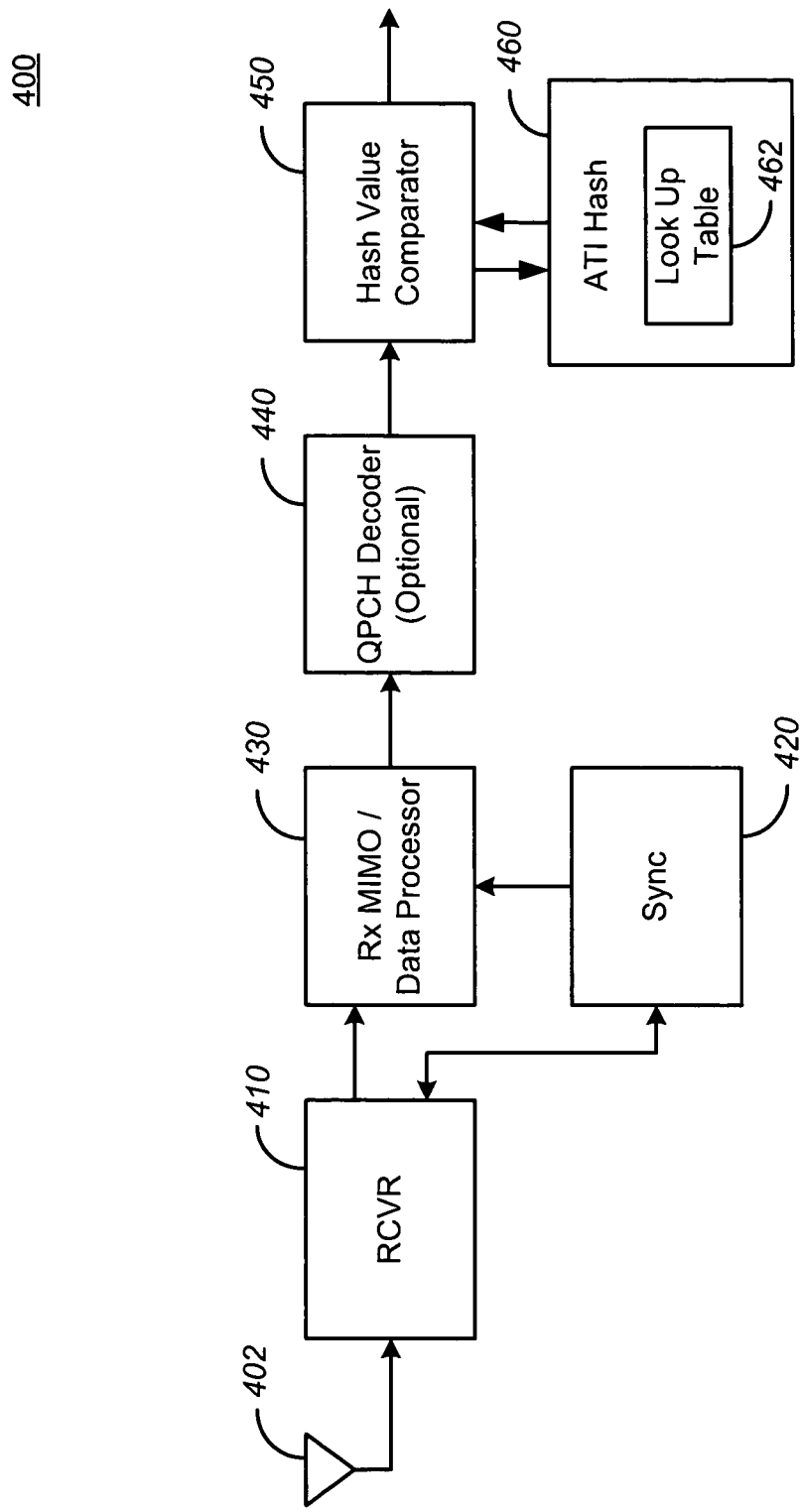
FIG. 4 is a simplified functional block diagram of an embodiment of a receiver configured to process the quick paging message.

FIG. 4 is a simplified functional block diagram of an embodiment of a receiver 400 configured to process the quick page message received over a QPCH. The receiver 400 can be a portion of each of the access terminals of FIG. 1, and can be a portion of the receiver system of FIG. 2. The simplified functional block diagram of FIG. 4 illustrates only those portions of the receiver 400 associated with processing the quick page message. The receiver 400 typically includes other processing modules.

The receiver 400 receives the OFDM symbol containing and recovers the quick page message. If the quick page message is encoded, the receiver 400 uses the redundant encoding information to increase the probability that the underlying bits in the quick paging block and load control block are successfully recovered. The receiver 400 uses the recovered quick page message information to determine whether to awaken or remain active to monitor for a subsequent paging channel message.

In one embodiment, if the CRC fails, the access terminal monitors the paging channel as a default action. If the CRC succeeds and a corresponding ATIH is set, the access terminal is instructed to monitor the paging channel. If the CRC succeeds, and the ATIH is absent and the 'more' bit is not asserted, the access terminal returns to a sleep state. If the CRC succeeds, and the ATIH is absent, but the 'more' bit is asserted, the access terminal determines if its ATIH is greater than the largest ATIH in the quick page message. If so, the access terminal monitors the paging messages. If not, the access terminal can transition to the sleep state.

The receiver 400 includes an antenna 402 that couples a received signal to a receiver front end 410. A synchronization module 420 operates in conjunction with the receiver front end 410. The synchronization module 420 determines, based on the received signal, the symbol timing and from the symbol timing the frame and superframe timing. The receiver front end 410 utilizes the synchronization information to recover the OFDM symbols, and in particular, the OFDM preamble having the OFDM symbol with the quick page message.

The receiver front end 410 couples the OFDM symbol having the quick page message to the RX MIMO data processor 430. The RX MIMO data processor 430 operates to demodulate the OFDM subcarriers on which the quick page message is modulated to recover the quick page message.

The RX MIMO data processor 430 demodulates the subcarriers in a complementary manner to which they were modulated. That is, if the subcarriers are QPSK modulated, the RX MIMO data processor 430 performs QPSK demodulation of the subcarriers.

The quick page message is optionally coupled to the decoder 440, depending on whether the source quick page message is encoded. The decoder 440 operates to decode the quick page message in a complementary fashion to the manner in which the packet was encoded in transmitter. In general, the QPCH decoder 440 performs the complement of the processing performed in the transmitter, including the complement of any interleaving, encoding, scrambling, repetition, and the like or combination thereof performed when generating the quick page message.

The output of the decoder 440 is coupled to a hash value comparator 450. The hash value comparator 450 is configured to parse the various ATIH values included within the quick page message and compare them against the ATIH value corresponding to the receiver 400. In one condition, where the hash value comparator 450 determines that there are no ATIH values in the quick paging message, the hash value comparator 450 does not need to make any comparisons, and the receiver 400 can transition to a sleep state in order to conserve power.

The hash value comparator 450 can examine the field in the quick page message identifying the number of ATIH values included within the quick page message. The hash value comparator 450 can determine from the number the length of the quick page message or the format of the ATIH values used in the quick page message, depending on the quick page message embodiment. Recall that in a variable length quick page message embodiment the ATIH format remains the same but the length of the message varies based on the number of quick pages. In a static length quick page message embodiment, the length of the message remains constant but the ATIH format varies based on the number of quick pages.

The hash value comparator 450 can couple the value corresponding to the number of quick pages, NumPages, to an ATIH module 460.

The ATIH module 460 is configured to generate the ATIH corresponding to the receiver 400 in a format that coincides with the format of the ATIH value included in the quick page message.

In one embodiment, the ATIH module 460 receives the NumPages value and generates the ATIH in the proper format using an algorithm. The ATIH module 460 can store the ATI of the receiver 400 can operate on the ATI using an algorithm to generate the ATIH in the proper format.

In another embodiment, the ATIH module 460 includes a look up table 462 that stores the different ATIH formats. The ATIH module 460 retrieves the proper ATIH format from the look up table 462 based on the value of NumPages.

The hash value comparator 450 can also extract the 'more' field from the quick page message. The 'more' field can be a single bit that is asserted when the number of quick pages exceeds the maximum number that can be included within a single quick page message. In the embodiment having a single bit for the 'more' field, the receiver 400 can have two primary branches of operation, depending on the 'more' bit.

If the 'more' bit is not asserted, the hash value comparator 450 determines whether the ATIH of the receiver 400 is included in the quick page message. If so, the receiver 400 monitors the subsequent paging message. Otherwise, the receiver conserves power by not monitoring the paging message. For example, the receiver 400 can transition to a sleep state and await the next quick page message.

If the 'more' bit is asserted, the hash value comparator 450 determines whether the ATIH of the receiver 400 is included in the quick page message. If so, the receiver monitors the subsequent paging message. If the hash value comparator 450 determines that the ATIH of the receiver 400 is greater than the largest ATIH in the quick page message, the receiver 400 monitors the subsequent paging message. Otherwise, if the hash value comparator 450 determines that the ATIH of the receiver 400 is not present in the quick page message and is not greater than the largest ATIH in the quick page message, the receiver 400 conserves power by not monitoring the paging message.

Other modules within the receiver 400 such as the paging module (not shown) can operate on the output of the hash value comparator 450. If the ATIH associated with the access terminal is present in the quick paging message, the paging module can direct the receiver to monitor for the paging message. Alternatively, if the ATIH associated with the access terminal is not present in the quick page message and is not indicated by the 'more' field, the paging module can direct the receiver to transition to a sleep state until the next occurrence of the quick paging message.

Figure 5:
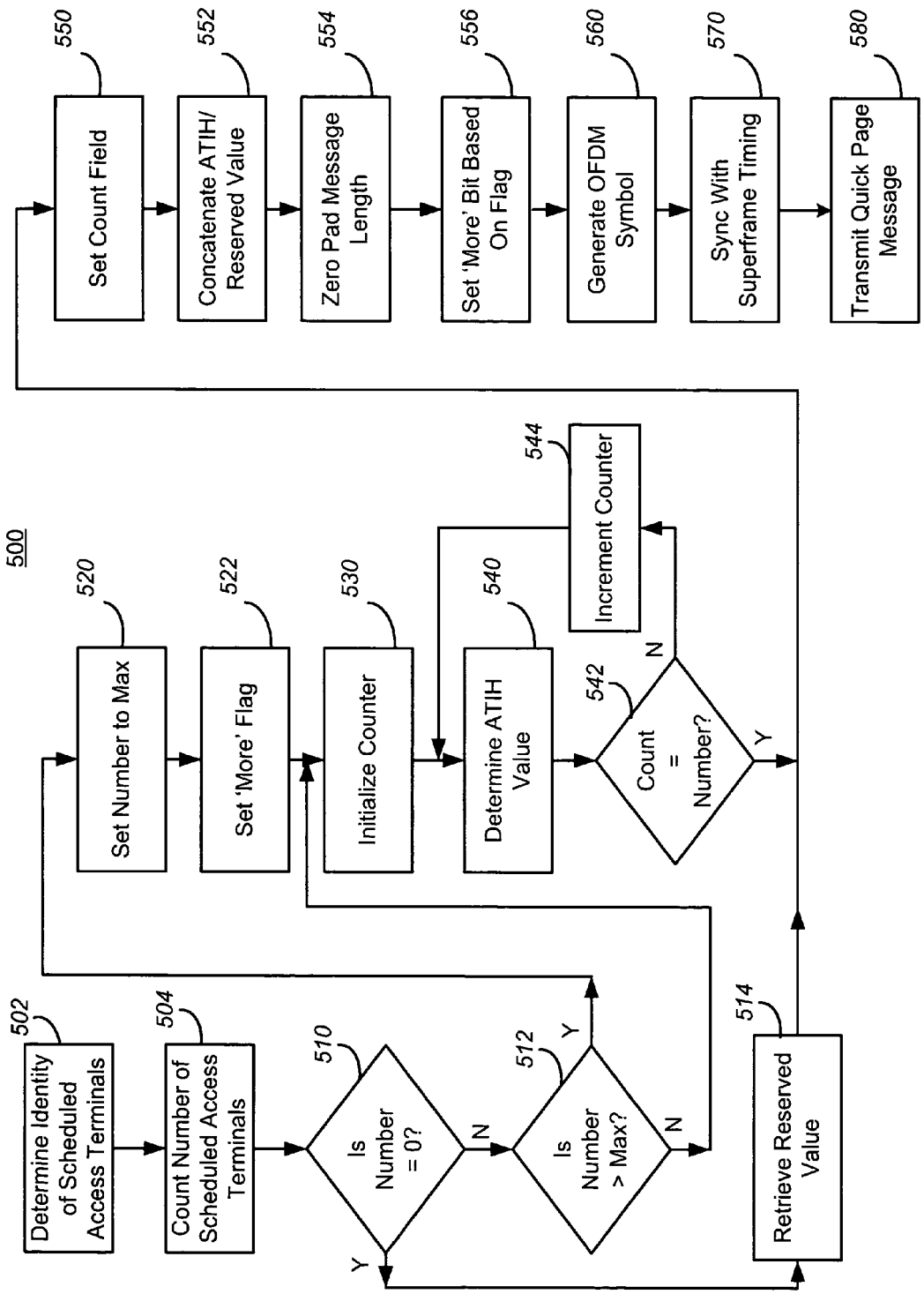
FIG. 5 is a simplified flowchart of an embodiment of a method of generating a quick page message.

FIG. 5 is a simplified flowchart of an embodiment of a method 500 of generating a quick page message. The method 500 can be performed, for example, by an access point of FIG. 1, a transmitter system of FIG. 2, or the system of FIG. 3.

The method 500 begins at block 502 where the system determines the identities of the access terminals having paging messages scheduled for transmission. The system can, for example, examine the ATI values in the paging messages to determine the identities of the unique access terminals scheduled to receive a paging message.

The system proceeds to block 504 and counts or otherwise determines the number of unique access terminals scheduled to receive paging messages. The system proceeds to decision block 510 and determines whether the number of access terminals scheduled to receive paging messages is zero. The system can, for example, compare the count value to the number zero. If so, the system transitions to block 514 and retrieves a reserved value that is indicative of the zero access terminals. The system proceeds from block 514 to block 550 described below.

If, at decision block 510, the system determines that the number of access terminals is not zero, the system proceeds to decision block 512 to determine if the number of access terminals scheduled to receive paging messages is greater than some predetermined maximum number, Max. If not, the system transitions to block 530 described below.

If, at decision block 512, the system determines that the number is greater than the predetermined maximum, Max, the system proceeds to block 520. At block 520, the system sets the number of pages in the quick page message, NumPage, to be equal to the maximum number. That is, the system sets NumPage=Max. The system proceeds to block 522 and sets a 'more' flag to indicate the presence of greater than Max quick pages.

The system proceeds to block 530 and initializes a counter that tracks a loop that determines the ATIH for each access terminal scheduled to receive a paging message, and orders the ATI values for the access terminals in order of smallest to largest. The system proceeds to block 540 and determines the ATIH of an access terminal according to the order of ATI values sorted upon initialization. In one embodiment, the system can determine the ATIH based in part on the NumPage value. The greater the NumPage value, the fewer the number of bits in the corresponding ATIH.

The system proceeds to decision block 542 to determine if the counter value is equal to the NumPage value. If not, not all ATIH values have been computed. The system proceeds to block 544 to increment the counter. The system returns from block 544 to block 540 to determine the next ATIH value.

If, at decision block 542, the system determines that the counter value is equal to the NumPage value, all ATIH values for the present quick page message have been determined. The system proceeds to block 550.

At block 550, the system begins assembling the quick page message. The system sets the number field, alternatively referred to as the count field, to the NumPage value to indicate the number of ATIH values within the quick paging message and, in some instances, the format of the ATIH value.

The system proceeds to block 552 and concatenates the ATIH values. In one embodiment, the system concatenates the ATIH values in a predetermined order, such as numeric order. In another embodiment, the system does not order the ATIH values before concatenating them. If there are no ATIH values and instead is only a reserved value indicating the presence of no pages, the system generates the quick paging message with the reserved value.

The system proceeds to block 554 and zero pads the quick paging message to make the quick page message a predetermined length. The system is not required to pad the quick paging block, and when padding is performed, the system is not required to insert a zero pad, but may include some other bits.

The system proceeds to block 556 and sets the 'more' field in the quick page message based on the status of the previously determined 'more' flag. The system proceeds to block 560 and generates an OFDM symbol having the quick page message. In one embodiment, the system can QPSK modulate each of the information carrying subcarriers of the OFDM system with portions of the quick page message.

The system proceeds to block 570 and synchronizes the occurrence of the OFDM symbol with a particular slot in the superframe timing. For example, the system can synchronize the occurrence of the quick page OFDM symbol with a particular position in a superframe preamble.

The system proceeds to block 580 and transmits the quick page message by frequency converting the OFDM symbol to a desired operating frequency and transmitting the OFDM symbol.

Figure 6:
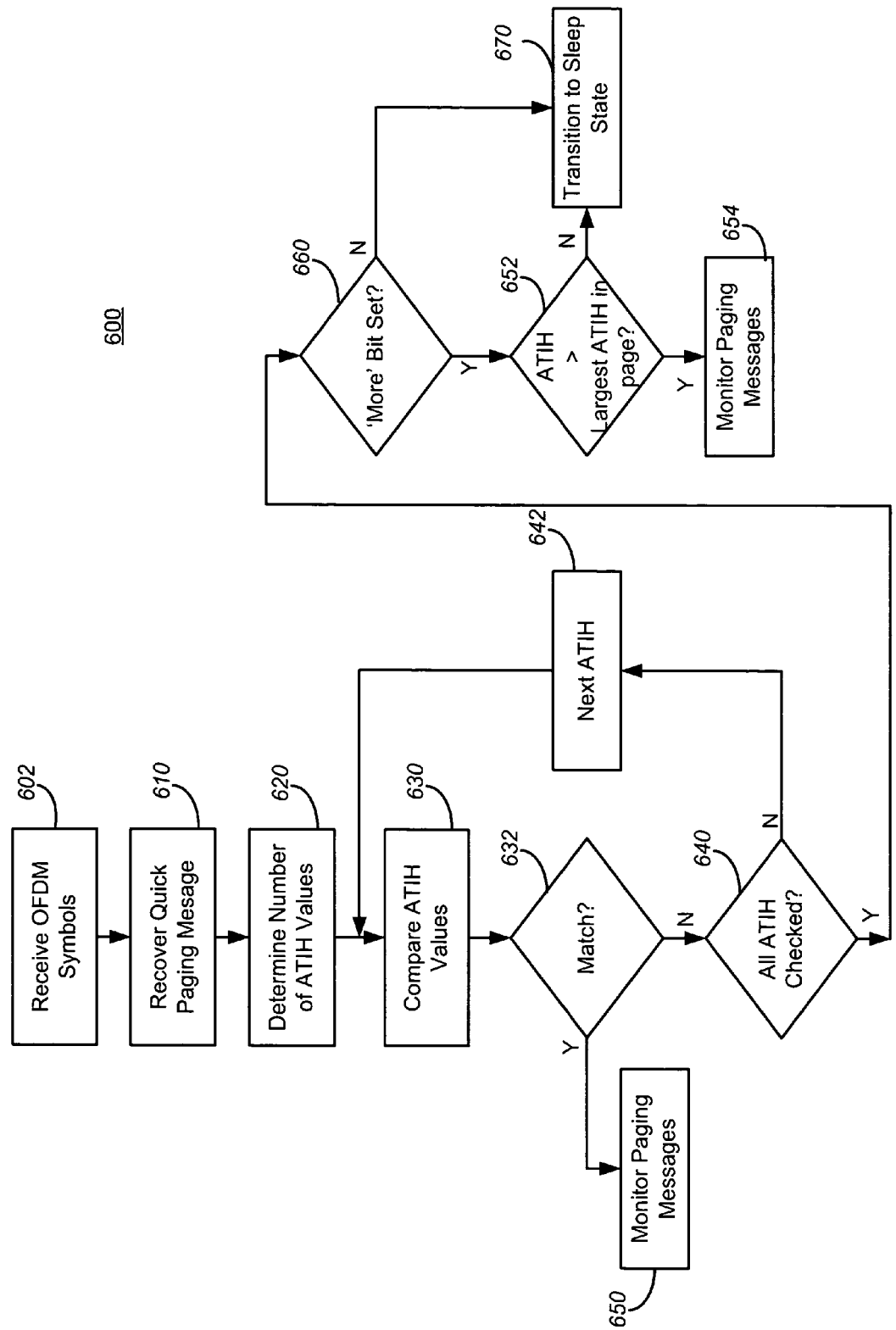
FIG. 6 is a simplified flowchart of an embodiment of a method of processing a quick page message.

FIG. 6 is a simplified flowchart of an embodiment of a method 600 of processing a quick page message. The method 600 can be implemented, for example, in an access terminal of FIG. 1, a receiver system of FIG. 2, or a receiver of FIG. 4.

The method 600 begins at block 602, where the receiver receives OFDM symbols, at least one of which includes some or all of the quick page message. The receiver proceeds to block 610 and recovers the quick page message from one or more of the received OFDM symbols. In one embodiment, the receiver synchronizes with superframe timing and recovers the entire quick paging message from a particular OFDM symbol occurring in a preamble of the superframe.

The receiver proceeds to block 620 and determines the number of ATIH values included in the quick paging message. In one embodiment, the receiver reads a NumPage value from a field in the quick page message. In another embodiment, the receiver may be able to determine the number of ATIH values based in part on a length of the quick page message, a preamble, a reserved termination field, or some combination of factors.

The receiver proceeds to block 630 and compares the ATIH values in the quick page message to the ATIH value corresponding to the receiver. The receiver may generate its ATIH value using an algorithm, or may retrieve its ATIH value from memory, such as from a look up table. The receiver can generate or retrieve its own ATIH in a format that is based at least in part on the NumPage value.

The receiver proceeds to decision block 632 to determine if the first ATIH matches the ATIH of the receiver. If so, the receiver need not perform any additional comparisons, and can proceed to block 650 and monitors the paging channel for one or more paging messages.

If, at decision block 632, the receiver determines that the present ATIH retrieved from the quick paging message does not match the ATIH of the receiver, the receiver proceeds to decision block 640 to determine if all ATIH values in the quick paging message have been examined. If not, the receiver proceeds to block 642 to retrieve the next ATIH from the quick paging message. The receiver then returns to block 630 to perform the comparison of ATIH values.

If, at decision block 640, the receiver determines that all ATIH values in the quick page message have been examined, the receiver proceeds to decision block 660 to determine whether the 'more' bit in the quick page message is asserted.

If the 'more' bit is not set, the receiver proceeds from decision block 660 to block 670 and can transition to the sleep state or may otherwise not monitor the paging channel for potential paging messages.

However, if the receiver determines at decision block 660 that the 'more' bit is set, the receiver transitions to decision block 652 to determine if the ATIH of the receiver is greater than the largest ATIH in the quick page message. If not, the receiver transitions to block 670 and can transition to the sleep state.

If the receiver determines that the ATIH of the receiver is greater than the largest ATIH in the quick page message, the receiver proceeds from decision block 652 to block 654 and monitors the paging channel for paging messages.

The above approach has advantage that when the number of quick pages that need to be sent is larger than the maximum number, only access terminals with an ATIH larger than the largest ATIH in the quick page message need to monitor the paging channel. Other access terminals can save power by not monitoring the paging channel.

When there are exactly the maximum number of pages, the unasserted 'more' bit conveys to all access terminals not identified in the quick page message that there is no paging message to receive on the paging channel. Those users can thus save power by not reading the page message.

Figure 7:
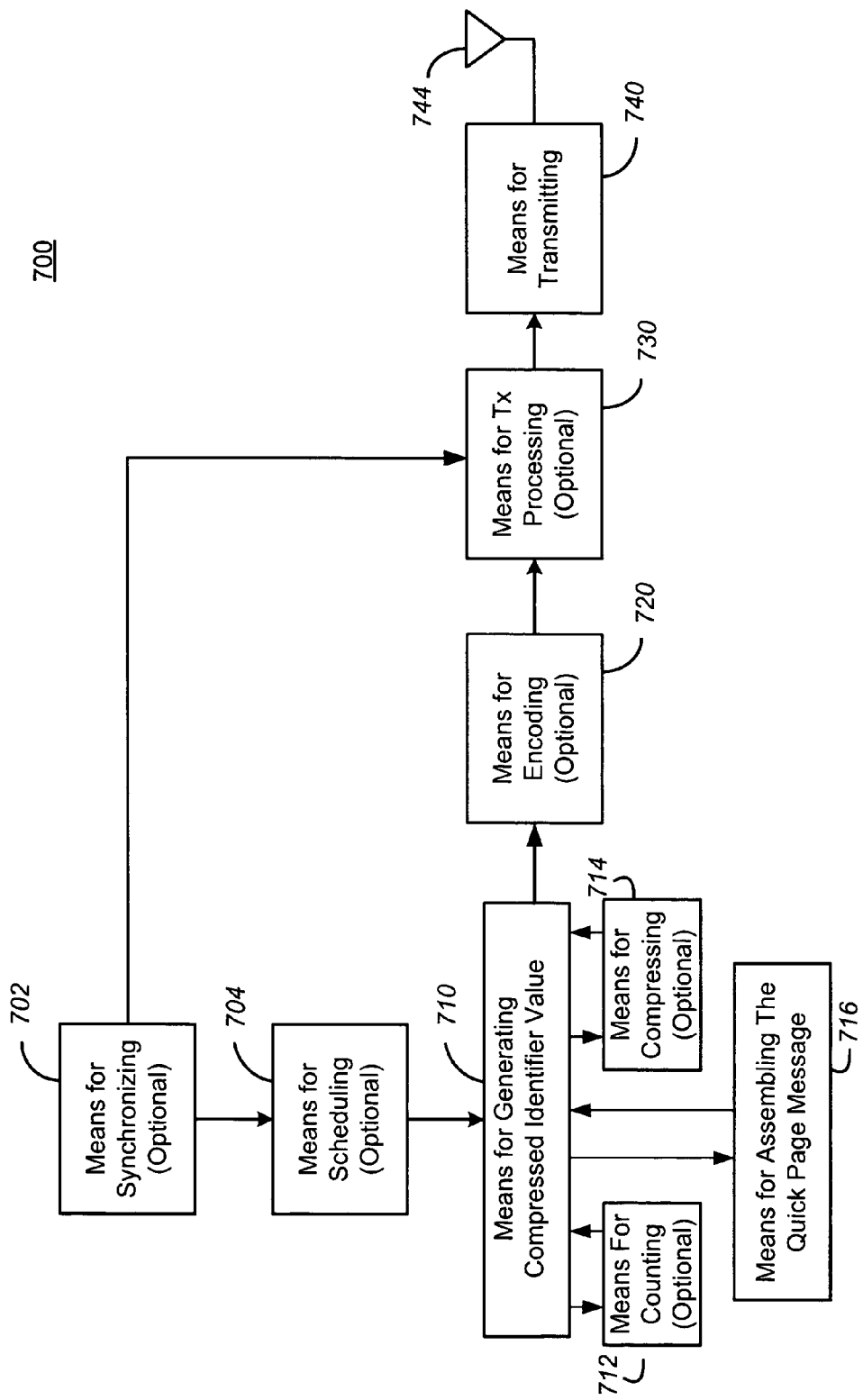
FIG. 7 is a simplified functional block diagram of an embodiment of a system for generating and transmitting a quick page message.

FIG. 7 is a simplified functional block diagram of an embodiment of a system 700 for generating and transmitting a quick page message.

The system 700 includes an optional means for synchronizing timing with a system time 702 that is coupled to a means for scheduling information 704. The optional means for scheduling information 704 can schedule based on output from the means for synchronizing timing with a system time 702. The means for scheduling information 704 can be configured to determine which of a plurality of access terminals has paging messages scheduled for transmission, and thus, the identities of one or more access terminals notified in the quick page message.

The means for scheduling information 704 is coupled to a means for generating a compressed identifier value 710 that is configured to generate a compressed identifier value for at least one access terminal notified in the quick page message based on the scheduled paging channel transmissions. The means for generating a compressed identifier value 710 can be coupled to optional means for counting a number of page messages 712 and optional means for compressing an access terminal identifier 714. The means for generating a compressed identifier value 710 also is coupled to a means for assembling the quick page message 716 that operates to generate the quick page message from the components generated in other blocks. For example, the means for assembling the quick page message 716 generates the quick page message including the compressed identifier.

The means for generating a compressed identifier value 710 optionally couples the quick page message to a means for encoding the quick page message 720. The means for encoding the quick page message 720 can encode the quick page message to generate an encoded quick page message. The means for encoding the quick page message 720 couples the encoded quick page message to an optional means for TX processing the quick page message 730. The means for processing the quick page message 730 can be configured to generate an OFDM symbol having the quick page message. The means for processing the quick page message 730 can also synchronize the OFDM symbol with the system timing, and can synchronize the OFDM symbol to occur during a predetermined slot in a preamble of a superframe.

The means for processing the quick page message 730 couples the OFDM symbol or symbols having the quick page message to a means for transmitting the a wireless signal 740 that is configured to frequency translate, amplify, filter, and otherwise process a wireless signal including at least a portion of the quick page message, such as the one or more OFDM symbols, to produce an RF signal that can be transmitted via the antenna 744.

Figure 8:
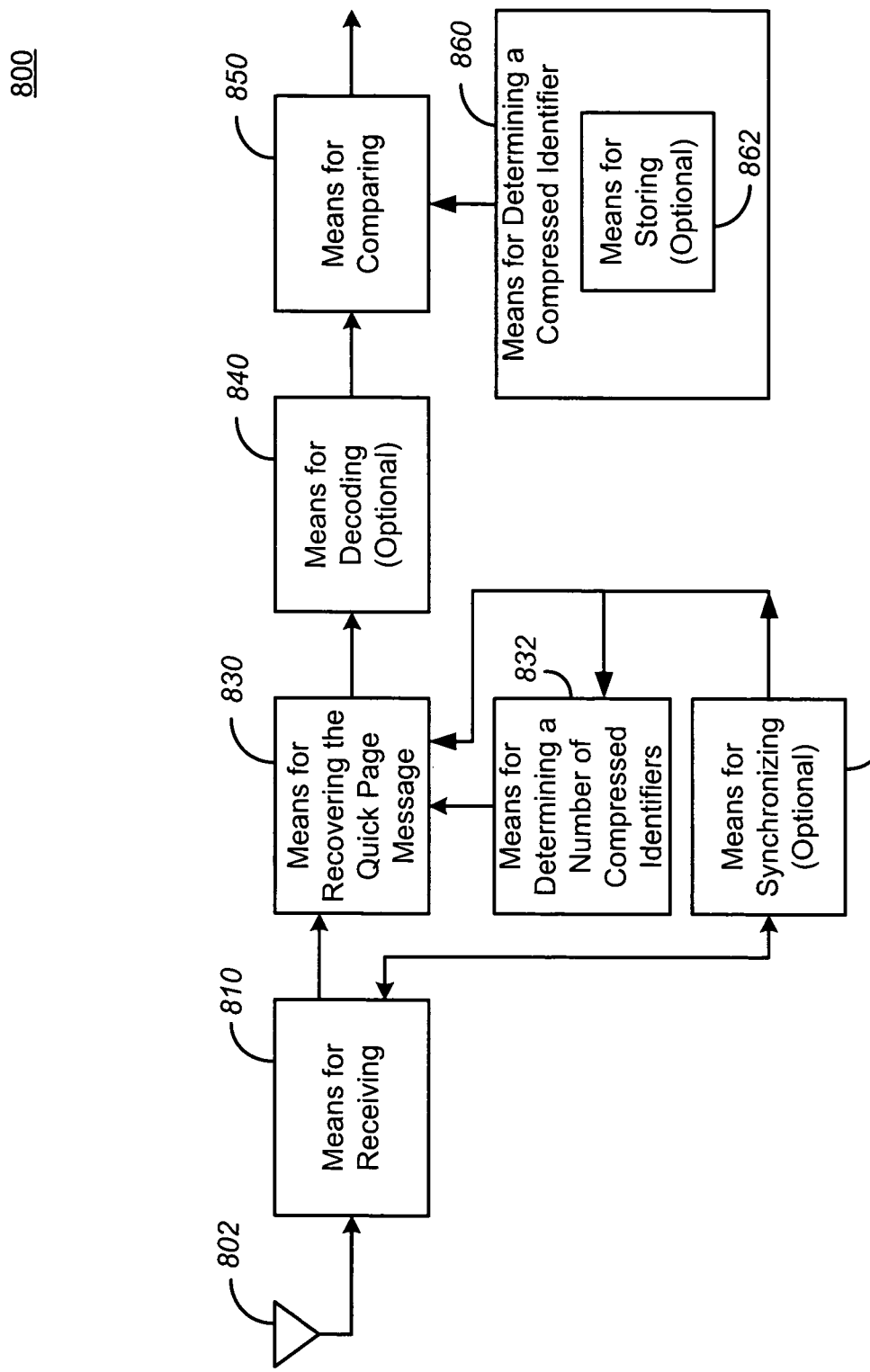
FIG. 8 is a simplified functional block diagram of an embodiment of a receiver configured to process the quick page message.

FIG. 8 is a simplified functional block diagram of an embodiment of a receiver 800 configured to process the quick page message. The receiver 800 includes an antenna 802 configured to receive a wireless signal, such as one or more OFDM symbols, having the quick paging message.

The antenna couples the OFDM symbol to a means for receiving a wireless signal having the quick page message 810 that is configured to process, for example, the received OFDM symbols to baseband OFDM symbols or samples. An optional means for synchronizing timing 820 operates to synchronize the received samples to align with the OFDM symbol timing.

The output of the means for receiving the wireless signal 810 is coupled to a means for recovering the quick page message 830 that is configured to process the OFDM symbol to recover the underlying information modulated on the OFDM subcarriers. For the OFDM symbol or symbols having the quick page message, the means for recovering the quick page message 830 demodulates the OFDM subcarriers to recover the quick page message, which can be an encoded quick page message. The means for recovering the quick page message 830 operates in conjunction with a means for determining a number of compressed identifiers in the quick page message 832 that operates to determine how many quick pages are included in the quick page message. The means for determining a number of compressed identifiers in the quick page message 832 can, for example, include means for reading a count field in the quick page message that is indicative of the number of compressed identifier values or number of quick pages.

The means for recovering the quick page message 830 couples an encoded quick page message to an optional means for decoding the quick page message 840 that is configured to decode the encoded quick page message in order to recover the quick page message. The output of the means for decoding the quick page message 820 is coupled to a means for comparing the compressed identifier values 850 of the quick page message. The means for comparing the compressed values 850 of the quick page message compares the compressed identifier values, which can be ATIH values, within the quick page message to the predetermined compressed identifier value corresponding to the access terminal or receiver.

The means for comparing the ATIH values 850 can also examine a 'more' field, such as a 'more' bit in the quick page message to determine if there are more access terminals scheduled for paging messages than could be represented in the quick page message. The receiver can determine what action to take based on the results of the comparison in combination with the results of the 'more' bit in the quick page message.

A means for determining a compressed identifier value 860 can be configured to generate or otherwise retrieve a compressed identifier value, such as an ATIH, in the format used in the quick page message. In one embodiment, the means for determining a compressed identifier 860 includes a means for storing compressed identifier values 862, and the means for determining a compressed identifier 860 retrieves an ATIH value of a particular format based on, for example, the number of pages in the quick page message.

Systems and methods are described herein for generating a quick page message and processing a quick page message. The quick page message described herein allows for flexibility in the format of the quick page message to reduce quick page collisions, while maintaining the ability to notify a virtually unlimited number of access terminals in a single quick page message.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

For a firmware and/or software implementation, the techniques described herein may be implemented as instructions (for example, procedures, functions, and so on) that perform the functions described herein. The firmware and/or software codes may be stored in a memory and executed by a processor or processors. The memory may be implemented within the processor or external to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of generating a quick page message in a wireless communication system, the method comprising:
   in an access point, generating a compressed identifier value for at least one access terminal to be notified in the quick page message, wherein the compressed identifier value is based on a number of access terminals scheduled to receive at least one paging message and represents a full length identifier that identifies the access terminal, wherein a rate of compression of the compressed identifier value varies based on the number of access terminals scheduled to receive the at least one paging message, and wherein the full length identifier can be determined based on the compressed identifier value;
   assembling the quick paging message including the compressed identifier based at least in part on a number of access terminals scheduled to receive at least one paging message; and
   generating a wireless signal including at least a portion of the quick page message.

2. The method of claim 1, wherein generating the wireless signal comprises generating an Orthogonal Frequency Division Multiplex (OFDM) symbol including at least the portion of the quick page message.

3. The method of claim 2, further comprising wireless transmitting the OFDM symbol during a superframe preamble.

4. The method of claim 1, further comprising:
   determining the number of access terminals scheduled to receive the at least one paging message;
   determining whether the number exceeds a predetermined maximum number; and
   populating a page number field in the quick page message based on whether the number exceeds the predetermined maximum number.

5. The method of claim 4, wherein populating the page number field comprises populating the page number field with the number if the number does not exceed the predetermined maximum number.

6. The method of claim 4, wherein populating the page number field comprises populating the page number field with the predetermined maximum number if the number exceeds the predetermined maximum number.

7. The method of claim 4, further comprising setting an indicator field in the quick page message based on whether the number exceeds the predetermined maximum number.

8. The method of claim 1, wherein generating the compressed identifier value comprises:
   determining the number of access terminals scheduled to receive the at least one paging message; and
   generating the compressed identifier value for at least one of the access terminals based at least in part on the number.

9. The method of claim 8, wherein generating the compressed identifier value based at least in part on the number comprises generating a hash value of an access terminal identifier based on the number.

10. The method of claim 8, wherein generating the compressed identifier value based at least in part on the number comprises:
    determining a compressed identifier bit length based on the number; and
    compressing an access terminal identifier to the compressed identifier value having the compressed identifier bit length.

11. The method of claim 1, wherein generating the compressed identifier value comprises generating the compressed identifier value based on an access terminal identifier of the at least one access terminal.

12. The method of claim 1, wherein assembling the quick paging message comprises concatenating a plurality of compressed identifier values.

13. The method of claim 1, wherein assembling the quick paging message comprises:
    sorting the compressed identifier values, each compressed identifier value corresponding to a distinct access terminal according to a predetermined algorithm; and
    concatenating the compressed identifier values in an order based on the sort.

14. The method of claim 1, further comprising wireless transmitting the wireless signal during a superframe preamble.

15. The method of claim 1, wherein generating the wireless signal comprises Quadrature Phase Shift Key (QPSK) modulating a plurality of Orthogonal Frequency Division Multiplex (OFDM) subcarriers with distinct portions of the quick page message.

16. A method of generating a quick page message in a wireless communication system, the method comprising:
    in an access point, determining the identity of access terminals scheduled to receive at least one paging message;
    determining the number of access terminals scheduled to receive at least one paging message;
    determining a compressed identifier value for each of at least a portion of the access terminals scheduled to receive at least one paging message, wherein each compressed identifier value is based on a number of access terminals scheduled to receive at least one paging message and represents a full length identifier that identifies an access terminal, wherein a rate of compression of the compressed identifier value varies based on the number of access terminals scheduled to receive the at least one paging message, and wherein the full length identifier can be determined based on the corresponding compressed identifier value; and
    assembling the quick page message based at least in part on the number of access terminals scheduled to receive at least one paging message and the compressed identifier value.

17. The method of claim 16, further comprising zero padding a reserved field of the quick page message to a predetermined length.

18. The method of claim 16, further comprising setting a field in the quick page message based in part on the number of access terminals scheduled to receive at least one paging message.

19. The method of claim 16, further comprising generating an Orthogonal Frequency Division Multiplex (OFDM) symbol having at least a portion of the quick paging message.

20. The method of claim 19, further comprising transmitting the OFDM symbol in a predetermined time slot of a superframe of the wireless communication system.

21. The method of claim 16, wherein determining the compressed identifier value comprises generating the compressed identifier based at least in part on the number of access terminals scheduled to receive at least one paging message.

22. The method of claim 16, wherein determining the compressed identifier value comprises generating a hash value based at least in part on an access terminal identifier value.

23. The method of claim 16, wherein assembling the quick page message comprises:
concatenating the compressed identifier values in an identifier field;
setting count field based on the number of access terminals scheduled to receive at least one paging message; and
setting an additional page field based on the number of access terminals scheduled to receive at least one paging message.

24. A method of processing a quick page message in a wireless communication system, the method comprising:
at an access terminal, receiving a wireless signal having the quick page message;
recovering the quick page message from the wireless signal, wherein the quick page message is based at least in part on a number of access terminals scheduled to receive at least one paging message;
determining a number of compressed identifier values in the quick page message, wherein each compressed identifier value is based on the number of access terminals scheduled to receive the at least one paging message and represents a full length identifier that identifies an access terminal, wherein a rate of compression of the compressed identifier value varies based on the number of access terminals scheduled to receive the at least one paging message, and wherein the full length identifier can be determined based on the corresponding compressed identifier value; and
comparing each compressed identifier value from the quick page message with a predetermined compressed identifier value.

25. The method of claim 24, further comprising determining a state of an additional page field in the quick page message.

26. The method of claim 24, wherein receiving the wireless signal having the quick page message comprises receiving an Orthogonal Frequency Division Multiplex (OFDM) symbol having at least a portion of the quick page message.

27. The method of claim 24, wherein recovering the quick page message comprises demodulating at least a subset of the subcarriers of an Orthogonal Frequency Division Multiplex (OFDM) symbol.

28. The method of claim 24, wherein determining the number of compressed identifier values comprises reading a count field in the quick page message indicative of the number of compressed identifier values.

29. The method of claim 24, wherein comparing each compressed identifier value comprises:
determining the predetermined compressed identifier value based on the number of compressed identifier values in the quick page message; and
comparing each compressed identifier value with the predetermined compressed identifier value.

30. The method of claim 29, wherein determining the predetermined compressed identifier value comprises generating the predetermined compressed identifier based on a compression algorithm and the number of compressed identifier values in the quick page message.

31. The method of claim 29, wherein determining the predetermined compressed identifier value comprises retrieving the predetermined compressed identifier from a storage device based in part on the number of compressed identifier values in the quick page message.

32. An apparatus for generating a quick page message, the apparatus comprising:
a paging message counter configured to determine a number of unique access terminals scheduled to receive a paging message;
a compressed identifier generator coupled to the paging message counter and configured to generate a compressed identifier, wherein each compressed identifier value is based on the number of unique access terminals scheduled to receive the paging message and represents a full length identifier that identifies an access terminal, wherein a rate of compression of the compressed identifier value varies based on the number of access terminals scheduled to receive the at least one paging message, and wherein the full length identifier can be determined based on the corresponding compressed identifier value; and
a message assembler coupled to the compressed identifier generator and configured to set a count field in the quick page message based on the number of unique access terminals, and further configured to concatenate the compressed identifiers corresponding to each of the subset of unique access terminals;
wherein the message assembler is further configured to set an additional identifier field in the quick page message based in part on the number of unique access terminals scheduled to receive at least one paging message.

33. The apparatus of claim 32, wherein the compressed identifier generator generates the compressed identifier for no greater than a predetermined maximum number of unique access terminals.

34. The apparatus of claim 32, wherein the compressed identifier generator generates the compressed identifier based at least in part on the number of unique access terminals.

35. The apparatus of claim 32, wherein the compressed identifier generator generates the compressed identifier based at least in part on an access terminal identifier.

36. The apparatus of claim 32, wherein the compressed identifier generator generates the compressed identifier based on a variable compression ratio that depends, in part, on the number of unique access terminals.

37. The apparatus of claim 32, wherein the compressed identifier generator generates a reserved value if the number of unique access terminals is zero.

38. An apparatus for processing a quick page message, the apparatus comprising:
a receiver configured to receive a wireless signal having the quick page message that is based at least in part on a number of access terminals scheduled to receive at least one paging message;
a receive processor coupled to the receiver and configured to extract the quick page message from the wireless signal;
a compressed value module configured to generate a predetermined compressed identifier; and
a comparator configured to extract at least one compressed identifier from the quick page message and compare it to the predetermined compressed identifier to determine whether the apparatus is notified of a scheduled paging message, wherein the compressed identifier value is based on the number of access terminals scheduled to receive the at least one paging message and represents a full length identifier that identifies the access terminal, wherein a rate of compression of the compressed identifier value varies based on the number of access terminals scheduled to receive the at least one paging message, and wherein the full length identifier can be determined based on the compressed identifier value.

39. The apparatus of claim 38, wherein the receive processor is configured to demodulate at least a subset of subcarriers of an Orthogonal Frequency Division Multiplex (OFDM) symbol to recover the quick page message.

40. The apparatus of claim 38, wherein the compressed value module is configured to generate the predetermined compressed identifier based in part on a number of compressed identifiers contained in the quick page message.

41. The apparatus of claim 38, wherein the compressed value module is configured to retrieve the predetermined compressed identifier from a plurality of predetermined identifiers stored in a storage device based in part on a number of compressed identifiers contained in the quick page message.

42. An apparatus for generating a quick page message, the apparatus comprising:
means for generating a compressed identifier value for at least one access terminal to be notified in the quick page message, wherein the compressed identifier value is based on a number of access terminals scheduled to receive at least one paging message and represents a full length identifier that identifies the access terminal, wherein a rate of compression of the compressed identifier value varies based on the number of access terminals scheduled to receive the at least one paging message, and wherein the full length identifier can be determined based on the compressed identifier value;
means for assembling the quick page message including the compressed identifier based at least in part on the number of access terminals scheduled to receive the at least one paging message; and
means for transmitting a wireless signal including at least a portion of the quick page message.

43. An apparatus for processing a quick page message, the apparatus comprising:
means for receiving a wireless signal having the quick page message that is based at least in part on a number of access terminals scheduled to receive at least one paging message;
means for recovering the quick page message from the wireless signal;
means for determining a number of compressed identifier values in the quick page message, wherein each compressed identifier value is based on the number of access terminals scheduled to receive the at least one paging message and represents a full length identifier that identifies an access terminal, wherein a rate of compression of the compressed identifier value varies based on the number of access terminals scheduled to receive the at least one paging message, and wherein the full length identifier can be determined based on the compressed identifier value; and
means for comparing each compressed identifier value from the quick page message with a predetermined compressed identifier value.

44. A non-transitory processor readable media including instructions that may be utilized by one or more processors, the instructions comprising:
instructions for generating a compressed identifier value for at least one access terminal notified in the quick page message, wherein the compressed identifier value is based on a number of access terminals scheduled to receive at least one paging message and represents a full length identifier that identifies the access terminal, wherein a rate of compression of the compressed identifier value varies based on the number of access terminals scheduled to receive the at least one paging message, and wherein the full length identifier can be determined based on the compressed identifier value;
instructions for assembling the quick paging message including the compressed identifier based at least in part on the number of access terminals scheduled to receive the at least one paging message; and
instructions for generating a signal including at least a portion of the quick page message, and coupling the signal to a wireless transmitter.

45. A non-transitory processor readable media including instructions that may be utilized by one or more processors, the instructions comprising:
instructions for receiving a signal having the quick page message based at least in part on a number of access terminals scheduled to receive at least one paging message;
instructions for recovering the quick page message from the signal;
instructions for determining a number of compressed identifier values in the quick page message, wherein each compressed identifier value is based on the number of access terminals scheduled to receive the at least one paging message and represents a full length identifier that identifies an access terminal, wherein a rate of compression of the compressed identifier value varies based on the number of access terminals scheduled to receive the at least one paging message, and wherein the full length identifier can be determined based on the compressed identifier value; and
instructions for comparing each compressed identifier value from the quick page message with a predetermined compressed identifier value.

46. The method of claim 1, wherein the full length identifier includes a number of bits ranging from 48 to 128.

47. The method of claim 16, wherein the full length identifier includes a number of bits ranging from 48 to 128.

48. The method of claim 24, wherein the full length identifier includes a number of bits ranging from 48 to 128.

49. The apparatus of claim 32, wherein the full length identifier includes a number of bits ranging from 48 to 128.

50. The apparatus of claim 38, wherein the full length identifier includes a number of bits ranging from 48 to 128.

51. The method of claim 1, wherein the rate of compression is directly proportional to the number of access terminals scheduled to receive the at least one paging message.

52. The method of claim 4, wherein populating the page number field further comprises concatenating a plurality of compressed identifier values in order of increasing value if the number of access terminals scheduled to receive the at least one paging message exceeds the predetermined maximum number.

* * * * *